(12) United States Patent
Tsuchiya et al.

(10) Patent No.: US 12,448,466 B2
(45) Date of Patent: *Oct. 21, 2025

(54) METHOD FOR PRODUCING PERFLUOROELASTOMER AND COMPOSITION

(71) Applicant: DAIKIN INDUSTRIES, LTD., Osaka (JP)

(72) Inventors: Soushi Tsuchiya, Osaka (JP); Taketo Kato, Osaka (JP); Masaki Irie, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 708 days.

This patent is subject to a terminal disclaimer.

(21) Appl. No.: 17/687,354

(22) Filed: Mar. 4, 2022

(65) Prior Publication Data

US 2022/0204658 A1    Jun. 30, 2022

Related U.S. Application Data

(63) Continuation of application No. PCT/JP2020/033484, filed on Sep. 3, 2020.

(30) Foreign Application Priority Data

Sep. 5, 2019  (JP) .................. 2019-162393
Nov. 19, 2019 (JP) .................. 2019-209161

(51) Int. Cl.
| | |
|---|---|
| C08F 2/22 | (2006.01) |
| C08F 14/18 | (2006.01) |
| C08J 3/24 | (2006.01) |
| C08L 27/12 | (2006.01) |

(52) U.S. Cl.
CPC ............ *C08F 2/22* (2013.01); *C08F 14/185* (2013.01); *C08J 3/24* (2013.01); *C08L 27/12* (2013.01)

(58) Field of Classification Search
None
See application file for complete search history.

(56) References Cited

U.S. PATENT DOCUMENTS

| | | | | |
|---|---|---|---|---|
| 7,455,934 B1 * | 11/2008 | Araki | .............. | H01M 8/1039 |
| | | | | 204/252 |
| 9,290,628 B2 * | 3/2016 | Komatsu | .............. | C08J 3/24 |
| 11,767,379 B2 * | 9/2023 | Nanba | .............. | C08F 259/08 |
| | | | | 526/242 |
| 2004/0019153 A1 | 1/2004 | Coughlin et al. | | |
| 2007/0004848 A1 | 1/2007 | Hintzer et al. | | |
| 2007/0208131 A1 | 9/2007 | Tsuda et al. | | |
| 2010/0160510 A1 | 6/2010 | Aten et al. | | |
| 2015/0021814 A1 * | 1/2015 | Aten | .............. | C08L 27/18 |
| | | | | 264/234 |
| 2016/0347895 A1 | 12/2016 | Morikawa et al. | | |
| 2018/0179374 A1 | 6/2018 | Noguchi et al. | | |
| 2020/0207880 A1 | 7/2020 | Higuchi et al. | | |
| 2020/0392266 A1 | 12/2020 | Nanba et al. | | |
| 2022/0002531 A1 | 1/2022 | Nanba et al. | | |
| 2022/0010118 A1 | 1/2022 | Nanba et al. | | |
| 2022/0185917 A1 | 6/2022 | Nanba et al. | | |
| 2022/0259337 A1 | 8/2022 | Yoneda et al. | | |
| 2023/0340169 A1 * | 10/2023 | Nanba | .............. | C08L 27/18 |

FOREIGN PATENT DOCUMENTS

| | | |
|---|---|---|
| CN | 111836835 A | 10/2020 |
| CN | 113039213 A | 6/2021 |
| CN | 113039241 A | 6/2021 |
| CN | 114269840 A | 4/2022 |
| JP | 11-181009 A | 7/1999 |
| JP | 2005-320501 A | 11/2005 |
| JP | 2008-545873 A | 12/2008 |
| JP | 2009-155558 A | 7/2009 |
| JP | 2010-235667 A | 10/2010 |
| JP | 2012-513534 A | 6/2012 |
| JP | 6974784 B2 | 12/2021 |
| WO | 2010/075494 A1 | 7/2010 |
| WO | 2015/125726 A1 | 8/2015 |
| WO | 2016/204272 A1 | 12/2016 |
| WO | 2018/167190 A1 | 9/2018 |
| WO | 2019/065638 A1 | 4/2019 |
| WO | WO-2019168183 A1 * | 9/2019 ........... B29C 55/005 |
| WO | 2020/105650 A1 | 5/2020 |
| WO | 2020/105651 A1 | 5/2020 |
| WO | 2020/218620 A1 | 10/2020 |
| WO | 2021/045227 A1 | 3/2021 |

OTHER PUBLICATIONS

International Search Report for PCT/JP2020/033484 dated, Dec. 1, 2020 (PCT/ISA/210).
International Preliminary Report on Patentability dated Mar. 8, 2022 with a Translation of the Written Opinion of the International Searching Authority in Application No. PCT/JP2020/033484.
Extended European Search Report issued Aug. 25, 2023 in Application No. 20859961.3.

* cited by examiner

*Primary Examiner* — Satya B Sastri
(74) *Attorney, Agent, or Firm* — Sughrue Mion, PLLC

(57) ABSTRACT

A method for producing a perfluoroelastomer, which includes carrying out polymerization of a perfluoromonomer in an aqueous medium in the presence of a polymer (1) having a number average molecular weight of $0.3 \times 10^4$ or more to provide a perfluoroelastomer, the polymer (1) containing a polymerized unit (1) derived from a monomer represented by the following general formula (1):

$$CX_2=CY(-CZ_2-O-Rf-A) \qquad (1)$$

wherein X, Y, Z, Rf and A are as defined herein, with the proviso that at least one of X, Y, and Z contains a fluorine atom.

9 Claims, No Drawings

METHOD FOR PRODUCING PERFLUOROELASTOMER AND COMPOSITION

CROSS-REFERENCE TO RELATED APPLICATIONS

This application is a Rule 53(b) Continuation of International Application No. PCT/JP2020/033484 filed Sep. 3, 2020, which claims priority based on Japanese Patent Application No. 2019-162393 filed Sep. 5, 2019 and Japanese Patent Application No. 2019-209161 filed Nov. 19, 2019, the respective disclosures of which are incorporated herein by reference in their entirety.

TECHNICAL FIELD

The present disclosure relates to a method for producing a perfluoroelastomer and a composition containing a perfluoroelastomer.

BACKGROUND ART

As a method for producing a perfluoroelastomer, for example, Patent Literature 1 proposes a method for producing a perfluoroelastomer aqueous dispersion characterized in that the method includes subjecting a perfluoromonomer to emulsion polymerization in an aqueous medium to obtain an aqueous dispersion containing perfluoroelastomer particles in the presence of 2 parts by mass or more of a fluorine-containing surfactant represented by the following general formula (1) based on 100 parts by mass of the aqueous medium:

$$X-(CF_2)_{m1}-Y \quad (1)$$

wherein X represents H or F; m1 represents an integer of 3 to 6; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal and R represents an alkyl group having 1 to 12 carbon atoms.

CITATION LIST

Patent Literature

Patent Literature 1: International Publication No. WO 2015/125726

SUMMARY

According to the present disclosure, provided is a method for producing a perfluoroelastomer, comprising carrying out polymerization of a perfluoromonomer in an aqueous medium in the presence of a polymer (1) to provide a perfluoroelastomer, the polymer (1) containing a polymerized unit (1) derived from a monomer represented by the following general formula (1):

$$CX_2=CY(-CZ_2-O-Rf-A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —SO$_3$M, —OSO$_3$M, or —C(CF$_3$)$_2$OM, where M is H, a metal atom, NR$^7_4$, imidazolium optionally having a substituent, pyridinium optionally having a substituent, or phosphonium optionally having a substituent and R$^7$ is —H or an organic group, with the proviso that at least one of X, Y, and Z contains a fluorine atom.

Effects

According to the present disclosure, a novel method for producing a perfluoroelastomer can be provided.

Also, according to the present disclosure, a novel composition containing a perfluoroelastomer can be provided.

DESCRIPTION OF EMBODIMENTS

Hereinafter, specific embodiments of the present disclosure will be described in detail, but the present disclosure is not limited the following embodiments.

Before describing the present disclosure in detail, some terms used in the present disclosure will be defined or described.

In the present disclosure, the term "fluoroelastomer" refers to an amorphous fluoropolymer. The term "amorphous" means that a fluoropolymer has a melting peak ($\Delta H$) of 4.5 J/g or lower as determined by differential scanning calorimetry (DSC) (temperature-increasing rate: 10° C./min) or differential thermal analysis (DTA) (temperature-increasing rate: 10° C./min). The fluoroelastomer exhibits elastomeric characteristics when crosslinked. The elastomeric characteristics means characteristics by which the polymer can be stretched and it can retain its original length when the force required to stretch the polymer is no longer applied.

In the present disclosure, the term "partially fluorinated elastomer" refers to a fluoropolymer comprising a fluoromonomer unit and having a perfluoromonomer unit content of less than 90 mol % based on all polymerized units, wherein the fluoropolymer has a glass transition temperature of 20° C. or lower and has a melting peak ($\Delta H$) of 4.5 J/g or lower.

In the present disclosure, the term "perfluoroelastomer" refers to a fluoropolymer having a perfluoromonomer unit content of 90 mol % or more based on all polymerized units, wherein the fluoropolymer has a glass transition temperature of 20° C. or lower, has a melting peak ($\Delta H$) of 4.5 J/g or lower, and further has a fluorine atom concentration in the fluoropolymer of 71% by mass or more. In the present disclosure, the fluorine atom concentration in the fluoropolymer is determined by calculation of the fluorine atom concentration (% by mass) in the fluoropolymer from the type and content of each monomer constituting the fluoropolymer.

In the present disclosure, the term "perfluoromonomer" refers to a monomer that is free from a carbon atom-hydrogen atom bond in the molecule. The above perfluoromonomer may be a monomer in which some of the fluorine atoms bonded to carbon atoms are replaced by chlorine atoms, or may have a nitrogen atom, an oxygen atom, a sulfur atom, a phosphorus atom, a boron atom, or a silicon atom in addition to carbon atoms. It is preferable that the above perfluoromonomer is a monomer in which all hydrogen atoms are replaced by fluorine atoms. The above perfluoromonomer do not include a monomer that provides a crosslinking site.

The term "monomer that provides a crosslinking site" refers to a monomer having a crosslinkable group that provides the fluoropolymer with a crosslinking site to form crosslinking by a curing agent (cure site monomer).

In the present disclosure, the content of each monomer constituting the perfluoroelastomer can be calculated by combining NMR, FT-IR, elemental analysis, fluorescent X-ray analysis, and other known methods as appropriate depending on the type of monomer.

In the present disclosure, the term "organic group" refers to a group containing one or more carbon atoms or a group formed by removing one hydrogen atom from an organic compound.

Examples of the "organic group" include:
an alkyl group optionally having one or more substituents;
an alkenyl group optionally having one or more substituents;
an alkynyl group optionally having one or more substituents;
a cycloalkyl group optionally having one or more substituents;
a cycloalkenyl group optionally having one or more substituents;
a cycloalkadienyl group optionally having one or more substituents;
an aryl group optionally having one or more substituents;
an aralkyl group optionally having one or more substituents;
a non-aromatic heterocyclic group optionally having one or more substituents;
a heteroaryl group optionally having one or more substituents;
a cyano group;
a formyl group;
RaO—;
RaCO—;
RaSO$_2$—;
RaCOO—;
RaNRaCO—;
RaCONRa—;
RaOCO—;
RaOSO$_2$—; and
RaNRbSO$_2$—,
wherein Ra is independently
an alkyl group optionally having one or more substituents;
an alkenyl group optionally having one or more substituents;
an alkynyl group optionally having one or more substituents;
a cycloalkyl group optionally having one or more substituents;
a cycloalkenyl group optionally having one or more substituents;
a cycloalkadienyl group optionally having one or more substituents;
an aryl group optionally having one or more substituents;
an aralkyl group optionally having one or more substituents;
a non-aromatic heterocyclic group optionally having one or more substituents; or
a heteroaryl group optionally having one or more substituents, and Rb is independently H or an alkyl group optionally having one or more substituents.

As the above organic group, an alkyl group optionally having one or more substituents is preferable.

Also, in the present disclosure, the term "substituent" refers to a group that is capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The above aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the above aliphatic group include alkyl groups having 1 to 8, preferably 1 to 4 carbon atoms in total, such as a methyl group, an ethyl group, a vinyl group, a cyclohexyl group, and a carbamoylmethyl group.

The above aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the above aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The above heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the above heterocyclic group include 5- or 6-membered heterocyclic groups having 2 to 12, preferably 2 to 10 carbon atoms in total, such as a 2-tetrahydrofuryl group and a 2-pyrimidyl group.

The above acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the above acyl group include acyl groups having 2 to 8, preferably 2 to 4 carbon atoms in total, such as an acetyl group, a propanoyl group, a benzoyl group, and a 3-pyridinecarbonyl group.

The above acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the above acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The above aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the above aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The above carbamoyl group may have an aliphatic group, an aromatic group, a heterocyclic group, or the like. Examples of the above carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The above aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the above aliphatic sulfonyl group include alkylsulfonyl groups having 1 to 6 carbon atoms in total, preferably 1 to 4 carbon atoms in total, such as a methanesulfonyl group.

The above aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the above aromatic sulfonyl group include arylsulfonyl groups having 6 to 10 carbon atoms in total, such as a benzenesulfonyl group.

The above amino group may have an aliphatic group, an aromatic group, a heterocyclic group, or the like.

The above acylamino group may have, for example, an acetylamino group, a benzoylamino group, a 2-pyridinecarbonylamino group, a propanoylamino group, or the like. Examples of the above acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The above aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The above sulfamoyl group may have an aliphatic group, an aromatic group, a heterocyclic group, or the like. Examples of the above sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The above aliphatic oxy group may be saturated or unsaturated, and may have a methoxy group, an ethoxy group, an i-propyloxy group, a cyclohexyloxy group, a methoxyethoxy group, or the like. Examples of the above aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The above aromatic amino group and heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The above aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The above carbamoylamino group may have an aliphatic group, an aryl group, a heterocyclic group, or the like. Examples of the above carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino group having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

In the present disclosure, the range represented by endpoints includes all numerical values that fall within that range (for example, 1 to 10 includes 1.4, 1.9, 2.33, 5.75, 9.98, and the like).

In the present disclosure, the description of "at least 1" includes all numerical values of 1 or more (for example, at least 2, at least 4, at least 6, at least 8, at least 10, at least 25, at least 50, at least 100, and the like).

Next, the method for producing a perfluoroelastomer of the present disclosure will be specifically described.

The present disclosure relates to a method for producing a perfluoroelastomer, comprising carrying out polymerization of a perfluoromonomer in an aqueous medium in the presence of a polymer (1) to provide a perfluoroelastomer, the polymer (1) containing a polymerized unit (1) derived from a monomer represented by the general formula (1):

$$CX_2=CY(-CZ_2-O-Rf-A) \qquad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —SO$_3$M, —OSO$_3$M, or —C(CF$_3$)$_2$OM, where M is H, a metal atom, NR$^7$$_4$, imidazolium optionally having a substituent, pyridinium optionally having a substituent, or phosphonium optionally having a substituent and R$^7$ is —H or an organic group, with the proviso that at least one of X, Y, and Z contains a fluorine atom.

The production method of the present disclosure can stably and efficiently produce a perfluoroelastomer by using the above polymer (1). In addition, according to the production method of the present disclosure, it is possible to produce the perfluoroelastomer at a sufficient polymerization rate and to obtain a sufficient number of perfluoroelastomer particles.

The polymer (1) may only comprise a polymerized unit (1) derived from one type of monomer represented by the general formula (1), or may comprise polymerized units (1) derived from two or more types of monomers represented by the general formula (1).

In the general formula (1), X is —H or —F. X may be both —F, or at least one thereof may be —H. For example, one thereof may be —F and the other may be —H, or both may be —H.

In the general formula (1), Y is —H, —F, an alkyl group, or a fluorine-containing alkyl group.

The above alkyl group is an alkyl group free from fluorine atoms and may have one or more carbon atoms. The above alkyl group preferably has 6 or less carbon atoms, more preferably 4 or less carbon atoms, and still more preferably 3 or less carbon atoms.

The above fluorine-containing alkyl group is an alkyl group containing at least one fluorine atom, and may have one or more carbon atoms. The above fluorine-containing alkyl group preferably has 6 or less carbon atoms, more preferably 4 or less carbon atoms, and still more preferably 3 or less carbon atoms.

The above Y is preferably —H, —F, or —CF$_3$, and more preferably —F.

In the general formula (1), Z is the same or different and is —H, —F, an alkyl group, or a fluoroalkyl group.

The above alkyl group is an alkyl group free from fluorine atoms and may have one or more carbon atoms. The above alkyl group preferably has 6 or less carbon atoms, more preferably 4 or less carbon atoms, and still more preferably 3 or less carbon atoms.

The above fluorine-containing alkyl group is an alkyl group containing at least one fluorine atom, and may have one or more carbon atoms. The above fluorine-containing alkyl group preferably has 6 or less carbon atoms, more preferably 4 or less carbon atoms, and still more preferably 3 or less carbon atoms.

The above Z is preferably or —CF$_3$, and more preferably —F.

In the general formula (1), at least one of the above X, Y, and Z contains a fluorine atom. For example, X may be and Y and Z may be —F.

In the general formula (1), the above Rf is a fluorine-containing alkylene group having 1 to 40 carbon atoms or a fluorine-containing alkylene group having 2 to 100 carbon atoms and having an ether bond. Note that the above fluorine-containing alkylene group having 2 to 100 carbon atoms and having an ether bond is an alkylene group that does not include a structure in which an oxygen atom is an end and contains an ether bond between carbon atoms.

The above fluorine-containing alkylene group preferably has 2 or more carbon atoms. The above fluorine-containing alkylene group also preferably has 30 or less carbon atoms, more preferably 20 or less carbon atoms, and still more preferably 10 or less carbon atoms. Examples of the above fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. It is preferable that the above fluorine-containing alkylene group is a perfluoroalkylene group.

The above fluorine-containing alkylene group having an ether bond preferably has 3 or more carbon atoms. The above fluorine-containing alkylene group having an ether bond also preferably has 60 or less carbon atoms, more preferably 30 or less carbon atoms, and still more preferably 12 or less carbon atoms. It is also preferable that the above fluorine-containing alkylene group having an ether bond is, for example, a divalent group represented by the following formula:

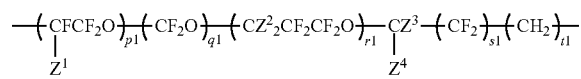

wherein Z$^1$ is F or CF$_3$; Z$^2$ and Z$^3$ are each H or F; Z$^4$ is H, F, or CF$_3$; p1+q1+r1 is an integer of 1 to 10; s1 is 0 or 1; and t1 is an integer of 0 to 5.

Specific examples of the above fluorine-containing alkylene group having an ether bond include —CF(CF$_3$)CF$_2$—O—CF(CF$_3$)—, —(CF(CF$_3$)CF$_2$—O)$_n$—CF(CF$_3$)— (where n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (where n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$— and —CF$_2$CF$_2$O—CF$_2$CH$_2$—.

It is preferable that the above fluorine-containing alkylene group having an ether bond is a perfluoroalkylene group.

In the general formula (1), A is —COOM, —SO$_3$M, —OSO$_3$M, or —C(CF$_3$)$_2$OM, where M is H, a metal atom, NR$^7$$_4$, imidazolium optionally having a substituent, pyridinium optionally having a substituent, or phosphonium optionally having a substituent and R$^7$ is —H or an organic group.

R$^7$ is preferably —H or a C$_{1-10}$ organic group, more preferably —H or a C$_{1-4}$ organic group, and still more preferably —H or a C$_{1-4}$ alkyl group.

Examples of the above metal atom include alkali metals (Group 1) and alkaline earth metals (Group 2), and preferred is —Na, —K, or —Li.

The above M is preferably H, a metal atom, or NR$^7$$_4$, more preferably H, an alkali metal (Group 1), an alkaline earth metal (Group 2), or NR$^7$$_4$, still more preferably H, Na, K, Li, or NH$_4$, further preferably Na, K, or NH$_4$, particularly preferably Na or NH$_4$, and most preferably NH$_4$.

The above A is preferably —COOM or —SO$_3$M, and more preferably —COOM.

Examples of the monomer represented by the general formula (1) include a fluoroallyl ether compound represented by the formula (1a):

$$CX_2=CFCF_2—O—(CF(CF_3)CF_2O)_{n5}—CF(CF_3)\text{-}A \qquad (1a)$$

wherein each X is the same and represents —H or —F; n5 represents an integer of 0 or 1 to 10; and A is as defined above.

In the formula (1a), the above n5 is preferably an integer of 0 or 1 to 5, more preferably 0, 1, or 2, and still more preferably 0 or 1, from the viewpoint that it is possible to obtain fluoroelastomer particles with a small primary particle size. The above A is preferably —COOM from the viewpoint that the polymerization reaction progresses further smoothly, and the above M is preferably H or $NH_4$ from the viewpoint that it is less likely to remain as impurities and that the heat resistance of obtained molded body is improved.

The above polymer (1) may be a homopolymer of the fluoroallyl ether compound represented by the general formula (1a) or may be a copolymer thereof with a further monomer.

It is preferable that the above polymerized unit (1) is a polymerized unit (1A) derived from a monomer represented by the general formula (1A):

$$CH_2=CF(-CF_2-O-Rf-A) \quad (1A)$$

wherein Rf and A are as described above.

The polymer (1) may be a homopolymer of the monomer represented by the general formula (1A) or may be a copolymer thereof with a further monomer.

Specific examples of the monomer represented by the formula (1A) include a monomer represented by the following formula:

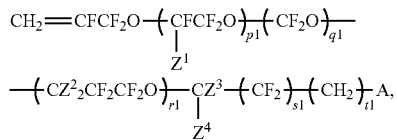

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5, with the proviso that when $Z^3$ and $Z^4$ are both H, p1+q1+r1+s1 is not 0; and A is as defined above. More specifically, preferred examples thereof include:

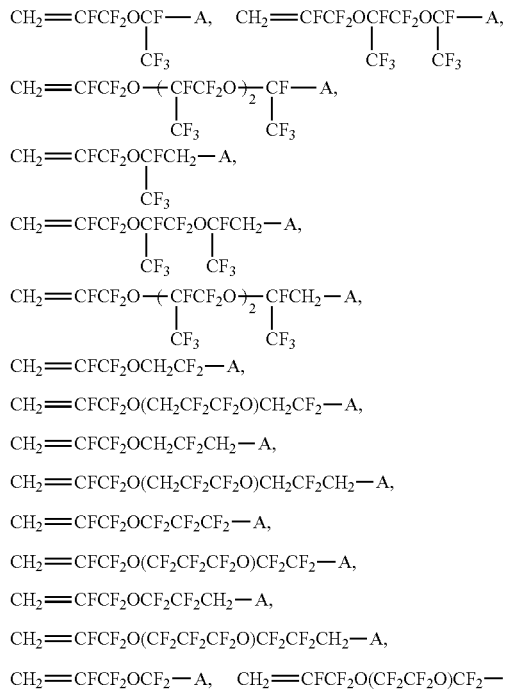

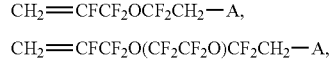

Of these,

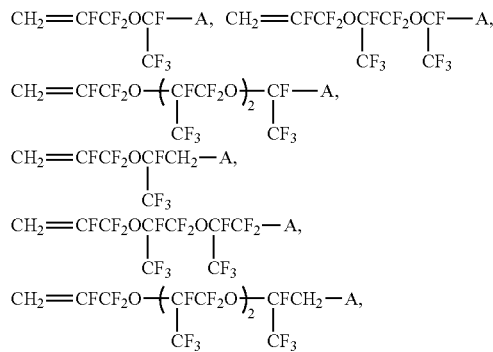

are preferred.

In the monomer represented by the general formula (1A), A in the formula (1A) is preferably —COOM. Specifically, the monomer represented by the general formula (1A) is preferably at least one selected from the group consisting of $CH_2=CFCF_2OCF(CF_3)COOM$ and $CH_2=CFCF_2OCF(CF_3)CF_2OCF(CF_3)COOM$ (wherein M is as defined above), and more preferably $CH_2=CFCF_2OCF(CF_3)COOM$.

Examples of the monomer represented by the general formula (1) further include a monomer represented by the following formula:

$$CF_2=CFCF_2-O-Rf-A$$

wherein Rf and A are as described above.

More specific examples thereof include:

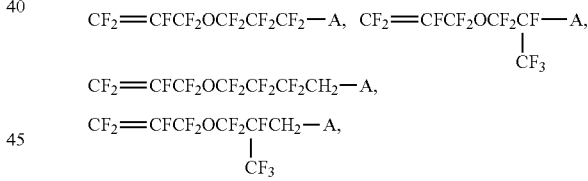

The polymer (1) may be a homopolymer comprising only the polymerized unit (1), or may be a copolymer comprising the polymerized unit (1) and a polymerized unit derived from a further monomer that is copolymerizable with the monomer represented by the general formula (1). From the viewpoint of solubility in the aqueous medium, preferred is a homopolymer comprising only the polymerized unit (1). The polymerized unit (1) may be the same or different in each occurrence, and the polymer (1) may contain polymerized units (1) derived from two or more different monomers represented by the general formula (1).

The above further monomer is preferably a fluorine-containing ethylenic monomer having 2 or 3 carbon atoms, and examples thereof include $CF_2=CF_2$, $CF_2=CFCl$, $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E isomer), and $CHF=CHCF_3$ (Z isomer).

Of these, preferred is at least one selected from the group consisting of tetrafluoroethylene ($CF_2=CF_2$), chlorotrifluoroethylene ($CF_2=CFCl$), and vinylidene fluoride ($CH_2=CF_2$) from the viewpoint of achieving good copolymerizability, and more preferred is tetrafluoroethylene.

Examples of the above further monomer further include a monomer represented by the following formula (n1-2):

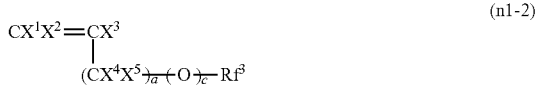
(n1-2)

wherein $X^1$ and $X^2$ are the same or different and are each H or F; $X^3$ is H, F, Cl, $CH_3$, or $CF_3$; $X^4$ and $X^5$ are the same or different and are each H or F; a and c are the same or different and are each 0 or 1; and $Rf^3$ is a fluorine-containing alkyl group having 1 to 40 carbon atoms or a fluorine-containing alkyl group having 2 to 100 carbon atoms and having an ether bond.

Specific preferred examples thereof include: $CH_2=CFCF_2-O-Rf^3$, $CF_2=CF-O-Rf^3$, $CF_2=CFCF_2-O-Rf^3$, $CF_2=CF-Rf^3$, $CH_2=CH-Rf^3$, and $CH_2=CH-O-Rf^3$ (wherein $Rf^3$ is as described in the above formula (n1-2)).

Examples of the above further monomer also include a fluorine-containing acrylate monomer represented by the formula (n2-1):

(n2-1)

wherein $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond. Examples of the above $Rf^4$ group include:

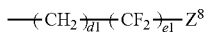

wherein $Z^8$ is H, F, or Cl; d1 is an integer of 1 to 4; and e1 is an integer of 1 to 10,

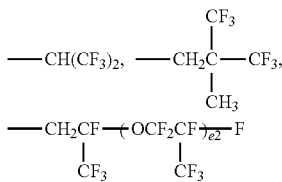

wherein e2 is an integer of 1 to 5,

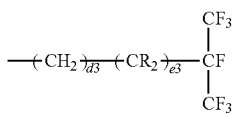

wherein d3 is an integer of 1 to 4; and e3 is an integer of 1 to 10.

Examples of the above further monomer also include a fluorine-containing acrylate monomer represented by the formula (n2-2):

(n2-2)

wherein $Rf^5$ is a fluorine-containing alkyl group having 1 to 40 carbon atoms or a fluorine-containing alkyl group having 2 to 100 carbon atoms and having an ether bond.

Specific preferred examples of the monomer of the formula (n2-2) include:

wherein $Z^9$ is H or F; and e4 is an integer of 1 to 10,

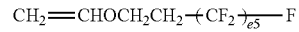

wherein e5 is an integer of 1 to 10,

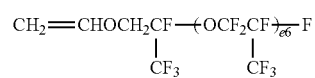

wherein e6 is an integer of 1 to 10.
More specifically,

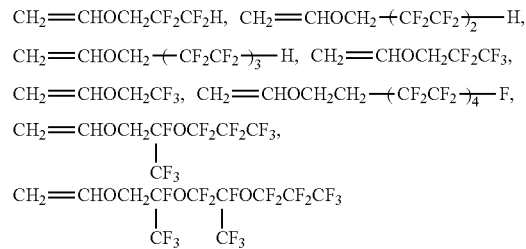

are exemplified.
Other examples thereof include:
a fluorine-containing allyl ether represented by the formula (n2-3):

(n2-3)

wherein $Rf^6$ is a fluorine-containing alkyl group having 1 to 40 carbon atoms or a fluorine-containing alkyl group having 2 to 100 carbon atoms and having an ether bond; and
a fluorine-containing vinyl monomer represented by the formula (n2-4):

(n2-4)

wherein $Rf^7$ is a fluorine-containing alkyl group having 1 to 40 carbon atoms or a fluorine-containing alkyl group having 2 to 100 carbon atoms and having an ether bond.

As specific examples of the monomers represented by the above formulas (n2-3) and (n2-4), monomers of

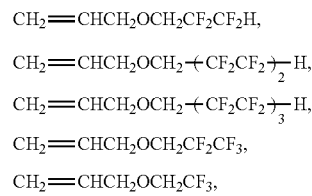

-continued

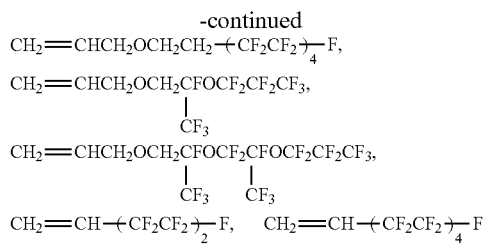

are exemplified.

The content of the polymerized unit (1) in the polymer (1) is preferably 1.0 mol % or more, more preferably 3.0 mol % or more, still more preferably 5.0 mol % or more, further preferably 10 mol % or more, still further preferably 20 mol % or more, and particularly preferably 30 mol % or more, based on all polymerized units. In addition, from the viewpoint that the fluoroelastomer can be produced even further smoothly, the content of the polymerized unit (1) in the polymer (1) is preferably 40 mol % or more, still more preferably 60 mol % or more, further preferably 80 mol % or more, particularly preferably 90 mol % or more, and most preferably substantially 100 mol %, based on all polymerized units.

The content of the polymerized unit derived from a further monomer that is copolymerizable with the monomer represented by the general formula (1) in the polymer (1) is preferably 70 mol % or less, more preferably 60 mol % or less, still more preferably 40 mol % or less, further preferably 20 mol % or less, particularly preferably 10 mol % or less, and most preferably substantially 0 mol %, based on all polymerized units.

The number average molecular weight of the polymer (1) is preferably $0.1 \times 10^4$ or more, more preferably $0.2 \times 10^4$ or more, still more preferably $0.3 \times 10^4$ or more, further preferably $0.4 \times 10^4$ or more, still further preferably $0.5 \times 10^4$ or more, particularly preferably $1.0 \times 10^4$ or more, and most preferably $3.0 \times 10^4$ or more. In addition, the number average molecular weight of the polymer (1) is preferably $75.0 \times 10^4$ or less, more preferably $50.0 \times 10^4$ or less, still more preferably $30.0 \times 10^4$ or less, and particularly preferably $20.0 \times 10^4$ or less. When the number average molecular weight is too low, the stability of the aqueous solution may be insufficient. When the number average molecular weight is too high, the polymer (1) may be partially sedimented, precipitated, or clouded due to storage or the addition of other additives.

The above number average molecular weight and the weight average molecular weight, which will be mentioned later, are values calculated by gel permeation chromatography (GPC) using monodisperse polystyrene as the standard. Also, in the case where measurement by GPC is not possible, the number average molecular weight of the polymer (1) can be determined by the correlation between the number average molecular weight calculated from the number of terminal groups obtained by NMR, FT-IR, or the like and the melt flow rate. The melt flow rate can be measured in accordance with JIS K 7210.

The weight average molecular weight of the polymer (1) is preferably $0.2 \times 10^4$ or more, more preferably $0.4 \times 10^4$ or more, still more preferably $0.6 \times 10^4$ or more, particularly preferably $0.8 \times 10^4$ or more, and most preferably $1.0 \times 10^4$ or more. In addition, the weight average molecular weight of the polymer (1) is preferably $150.0 \times 10^4$ or less, more preferably $100.0 \times 10^4$ or less, still more preferably $60.0 \times 10^4$ or less, and particularly preferably $40.0 \times 10^4$ or less.

It is preferable that the polymer (1) has an ion exchange rate (IXR) of 53 or less. The above IXR is defined as the number of carbon atoms in the polymer main chain relative to the ionic groups. Precursor groups that become ionic by hydrolysis (for example, —SO$_2$F) are not considered to be ionic groups, for the purpose of determining the IXR. The IXR of the polymer (1) is preferably 0.5 or more, more preferably 1 or more, still more preferably 3 or more, further preferably 4 or more, still further preferably 5 or more, and particularly preferably 8 or more. The IXR of the polymer (1) is also more preferably 43 or less, still more preferably 33 or less, and particularly preferably 23 or less.

The ion exchange capacity of the polymer (1) is, in the preferred order, 0.80 meq/g or more, 1.50 meq/g or more, 1.75 meq/g or more, 2.00 meq/g or more, 2.50 meq/g or more, 2.60 meq/g or more, 3.00 meq/g or more, or 3.50 meq/g or more. The ion exchange capacity is the content of ionic groups (anionic groups) in the polymer (1) and can be determined by calculation from the compositional features of the polymer (1).

In the polymer (1), the ionic groups (anionic groups) are typically distributed along the polymer main chain. The above polymer (1) contains the polymer main chain together with repeating side chains bonded to this main chain, and it is preferable that these side chains have ionic groups.

It is preferable that the polymer (1) contains ionic groups having a pKa of less than 10, more preferably less than 7. The ionic groups of the polymer (1) are preferably selected from the group consisting of sulfonate, carboxylate, phosphonate, and phosphate.

The term "sulfonate, carboxylate, phosphonate, and phosphate" is intended to refer to the respective salts or the respective acids that can form the salts. When a salt is used, that salt is preferably an alkali metal salt or an ammonium salt. The preferred ionic group is a sulfonate group.

It is preferable that the polymer (1) has water-solubility. The term "water-solubility" refers to the property of being easily dissolved or dispersed in an aqueous medium. When the polymer (1) has water-solubility, the particle size thereof cannot be measured by, for example, dynamic light scattering (DLS). On the other hand, when the polymer (1) has water-insolubility, the particle size thereof can be measured by, for example, dynamic light scattering (DLS).

The polymer (1) may be produced by a conventionally known method, provided that any of the above monomers are used.

It is preferable that the polymer (1) is added in an amount of 0.01 to 20% by mass based on 100% by mass of the aqueous medium. When the amount of the polymer (1) added in the above polymerization (the amount present) is within the above range, the polymerization reaction of the perfluoromonomer progresses smoothly and the perfluoroelastomer can be produced efficiently. When the amount of the polymer (1) added is too small, a sufficient polymerization rate cannot be obtained or a sufficient yield cannot be obtained.

Since the polymerization reaction of the perfluoromonomer progresses further smoothly, the amount of the polymer (1) added is more preferably 0.1% by mass or more, still more preferably 0.5% by mass or more, further preferably 1.0% by mass or more, particularly preferably 1.5% by mass or more, and most preferably 2.0% by mass or more, based on 100% by mass of the aqueous medium.

In addition, when the amount added is too large, effects commensurate with the amount added cannot be obtained, which is economically disadvantageous, and therefore, the amount of the polymer (1) added is more preferably 15% by mass or less, still more preferably 10% by mass or less, and particularly preferably 5% by mass or less, based on 100% by mass of the aqueous medium.

The timing of addition of the polymer (1) in the above polymerization is not limited, and it may be added before the initiation of the polymerization or may be added after the initiation of the polymerization. In addition, in the above polymerization, the polymer (1) may be added all at once at an arbitrary timing, or it may be added continuously. Adding the polymer (1) continuously means, for example, adding the polymer (1) not all at once, but adding over time and without interruption or adding in portions. When the polymer (1) is added continuously, it is preferable to add the polymer (1) such that the total amount of the polymer (1) added is in the range described above. When the polymer (1) is added, an aqueous solution containing the polymer (1) and water may be prepared and that aqueous solution may be added.

The polymer (1) may be produced by a conventionally known method, provided that any of the above monomers are used.

Also, as the polymer (1), a polymer (1) in which the content of the dimer and trimer of the monomer represented by the general formula (1) (hereinafter, may be referred to as a monomer (1)) is 1.0% by mass or less based on the polymer (1) may be used.

That is, it is also preferable that the production method of the present disclosure comprise:
polymerizing the monomer (1) represented by the general formula (1) in the aqueous medium to provide a crude composition containing the polymer of the monomer (1);
removing the dimer and trimer of the monomer (1) contained in the crude composition from the crude composition to obtain the polymer (1) in which the content of the dimer and trimer of the monomer (1) is 1.0% by mass or less based on the polymer (1); and
carrying out the polymerization of the perfluoromonomer in the aqueous medium in the presence of the polymer (1) to provide the perfluoroelastomer.

The polymer (1) used in the above production method is substantially free from the dimer and trimer of the monomer (1). The dimer and trimer of the monomer (1) are usually generated when the monomer (1) is polymerized to obtain the polymer (1). The content of the dimer and trimer in the polymer (1) is 1.0% by mass or less, preferably 0.1% by mass or less, more preferably 0.01% by mass or less, still more preferably 0.001% by mass or less, and particularly preferably 0.0001% by mass or less, based on the polymer (1).

The content of the dimer and trimer in the polymer (1) can be specified by carrying out gel permeation chromatography (GPC) analysis of the polymer (1) and calculating the proportion (area percentage) of the total area of the dimer and trimer peaks to the total area of each peak in the chromatogram obtained by the GPC analysis.

Also, when the content of the dimer and trimer in the polymer (1) is less than 0.5% by mass based on the polymer (1), it can be specified by measurement by liquid chromatography-mass spectrometry (LC/MS/YE).

Specifically, aqueous solutions having five or more different content levels of the monomer (1) are prepared, the LC/MS/MS analysis is carried out on the aqueous solutions with the respective content levels, and the relationship between the content level and the area (peak integrated value) corresponding to that content level is plotted to prepare a calibration curve of the monomer (1). Furthermore, from the calibration curve of the monomer (1), a calibration curve of the dimer and trimer of the monomer (1) is prepared.

Methanol is added to the polymer (1) to prepare a mixture, the mixture is centrifuged to collect an extracted liquid (supernatant) from the mixture, and the obtained extracted liquid is subjected to the LC/MS/MS analysis.

Then, using the calibration curve, the area (peak integrated value) of the chromatogram of the dimer and trimer of the monomer (1) can be converted to the content of the dimer and trimer.

By using the polymer (1) substantially free from the dimer and trimer when polymerizing the perfluoromonomer in the aqueous medium, a perfluoroelastomer substantially free from the dimer and trimer of the monomer (1) can be produced.

The polymer (1) is a polymer comprising the polymerized unit (1) derived from the monomer (1). The polymer (1) used in the present disclosure is a polymer in which the dimer (polymer comprising two polymerized units (1)) and the trimer (polymer comprising three polymerized units (1)) have been substantially removed from the polymer (1) containing two or more polymerized units (1).

It is preferable that the molecular weight of the monomer (1) is 400 or less. That is, it is preferable that the polymer (1) is substantially free from the dimer and trimer with a molecular weight of 1,200 or less.

The dimer and trimer of the polymer (1) may be a polymer foamed from, among monomers (1) represented by the general formula (1), one type of monomer (1), or may be a copolymer famed from two or more types of monomers (1) with different structures.

The polymerization of the monomer (1) can be carried out by a known method. By producing the crude composition by such a method, a crude composition in which the polymer (1) is dispersed or dissolved in the aqueous medium can be obtained.

It is preferable that the polymerization of the monomer (1) is carried out in the aqueous medium substantially in the absence of a fluorine-containing surfactant (except for the monomer (1) represented by the general formula (1)).

In the present disclosure, the expression "substantially in the absence of a fluorine-containing surfactant" means that the amount of the fluorine-containing surfactant is 10 ppm by mass or less based on the aqueous medium. The amount of the fluorine-containing surfactant based on the aqueous medium is preferably 1 ppm by mass or less, more preferably 100 ppb by mass or less, still more preferably 10 ppb by mass or less, and further preferably 1 ppb by mass or less.

The fluorine-containing surfactant will be mentioned later in the description on the polymerization of the perfluoromonomer.

In the crude composition thus obtained, as the polymer of the monomer (1), the dimer and trimer are usually contained in a total amount of greater than 1.0% by mass based on the mass of the polymer of the monomer (1). For example, the content of the dimer and trimer in the polymer of the monomer (1) may be 2.0% by mass or more or 3.0% by mass or more, and may be 30.0% by mass or less or 20.0% by mass or less, based on the polymer of the monomer (1). The content of the dimer and trimer in the crude composition can be specified by carrying out gel permeation chromatography (GPC) analysis of the crude composition and calculating the proportion (area percentage) of the total area of the dimer and trimer peaks to the total area of each peak in the chromatogram obtained by the GPC analysis.

Next, the dimer and trimer of the monomer (1) contained in the crude composition obtained by the polymerization of the monomer (1) are removed from the crude composition. The means of removing the dimer and trimer is not limited, but at least one means selected from the group consisting of ultrafiltration, microfiltration, and dialysis membrane treatment is preferable, at least one means selected from the group consisting of microfiltration and dialysis membrane treatment is more preferable, and ultrafiltration is still more preferable.

It has not been conventionally known that the polymerization of the monomer (1) produces the dimer and trimer of the monomer (1), resulting in the inclusion of the dimer and trimer of the monomer (1) in the polymer (1). Although the mechanism by which the dimer and trimer of the monomer (1) are produced is not necessarily clear, it is presumed that dimerization and trimerization of the monomer (1) occur with a non-negligible frequency, especially through a polymerization reaction in a polymerization system in which the monomer (1) accounts for the majority of the monomers present in the polymerization system. In the present disclosure, the presence of the dimer and trimer of the monomer (1) in the polymer (1) has been revealed for the first time, and it has been found for the first time that the dimer and trimer of the monomer (1) in the polymer (1) can be removed from the polymer (1) (crude composition) with high efficiency by at least one means selected from the group consisting of ultrafiltration, microfiltration, and dialysis membrane treatment.

When removing the dimer and trimer, the unreacted monomer (1) is usually also removed from the crude composition at the same time. Even when the unreacted monomer (1) is incorporated into the perfluoroelastomer by the polymerization, it does not necessarily have an adverse effect on the function of the perfluoroelastomer, and therefore, the unreacted monomer (1) does not necessarily need to be removed. However, by removing the unreacted monomer (1) at the same time as the dimer and trimer, the amount of monomer subjected to the polymerization can be calculated without taking into account the presence of the unreacted monomer (1), which has an advantage that it is possible to easily produce a perfluoroelastomer having the desired monomeric composition. Note that, even when the monomer (1) remains in the polymer (1) or when the monomer (1) is newly added as a comonomer, dimerization and trimerization of the monomer (1) hardly progress through a polymerization reaction in a polymerization system in which the fluoromonomer (except for the monomer (1)) accounts for the majority of the monomers present in the polymerization system, and the dimer and trimer of the monomer (1) hardly remain in the resulting perfluoroelastomer.

The crude composition obtained by the polymerization of the monomer (1) may be a composition as polymerized, obtained from the polymerization, may be one famed by diluting or concentrating the composition as polymerized, obtained from the polymerization, or may be one that has undergone dispersion stabilization treatment or the like. It is also preferable to adjust the viscosity of the crude composition by such treatment in order to facilitate ultrafiltration, microfiltration, or dialysis membrane treatment.

The content of the polymer of the monomer (1) in the crude composition is not limited, and may be, for example, 0.1 to 20% by mass. From the viewpoint of removal efficiency of the dimer and trimer, the content of the polymer of the monomer (1) in the crude composition is preferably 18.0% by mass or less, more preferably 15.0% by mass or less, still more preferably 12.0% by mass or less, and particularly preferably 10.0% by mass or less, and it is preferably 0.5% by mass or more, more preferably 1.0% by mass or more, still more preferably 1.2% by mass or more, and particularly preferably 1.5% by mass or more. The content of the polymer of the monomer (1) in the crude composition can be adjusted by, for example, a method in which water is added to the crude composition obtained by the polymerization of the monomer (1), a method in which the crude composition obtained by the polymerization of the monomer (1) is concentrated, and the like.

The pH of the crude composition is preferably 0 to 11, more preferably 0.5 to 8.0, and still more preferably 1.0 to 7.0. The pH of the crude composition can be adjusted by adding a pH adjuster to the crude composition obtained by the polymerization of the monomer (1). The pH adjuster may be an acid or an alkali, and examples thereof include phosphates, sodium hydroxide, potassium hydroxide, and aqueous ammonia.

The viscosity of the crude composition is preferably 25 mPa·s or less, since ultrafiltration, microfiltration, or dialysis membrane treatment proceeds smoothly. The viscosity of the crude composition can be adjusted by, for example, a method in which the number average molecular weight of the polymer of the monomer (1) is adjusted, a method in which the concentration of the polymer of the monomer (1) in the crude composition is adjusted, a method in which the temperature of the crude composition is adjusted, and the like.

Although the above ultrafiltration or microfiltration is not limited and may be either cross-flow type or dead-end type, the cross-flow type is preferable from the viewpoint of reducing membrane clogging.

The above ultrafiltration can be carried out using an ultrafiltration membrane. The ultrafiltration can be carried out using, for example, an ultrafiltration device having an ultrafiltration membrane, and the centrifugal ultrafiltration method, batch ultrafiltration method, circulating ultrafiltration method, and the like can be adopted.

The molecular weight cut-off of the above ultrafiltration membrane is usually about $0.1 \times 10^4$ to $30 \times 10^4$ Da. The above ultrafiltration membrane preferably has a molecular weight cut-off of $1.5 \times 10^4$ Da or more, since it can suppress membrane clogging and efficiently reduce the dimer and trimer. The above molecular weight cut-off is more preferably $2.0 \times 10^4$ Da or more, particularly preferably $3.0 \times 10^4$ Da or more, and most preferably $5.0 \times 10^4$ Da or more. The above molecular weight cut-off may be $8.0 \times 10^4$ Da or more. In addition, the above molecular weight cut-off is preferably $20 \times 10^4$ Da or less, and more preferably $10 \times 10^4$ Da or less, from the viewpoint of removal efficiency of the dimer and trimer.

The molecular weight cut-off of the above ultrafiltration membrane can be determined by, for example, passing a polystyrene with a known weight average molecular weight through the membrane and using a molecular weight that can be blocked by 90% as the molecular weight cut-off. Quantification of the polystyrene can be carried out using gel permeation chromatography.

Although the shape of the above ultrafiltration membrane is not limited to those conventionally known, for example, it may be hollow fiber type, flat membrane type, spiral type, tubular type, or the like. The hollow fiber type is preferable from the viewpoint of inhibiting clogging.

The inner diameter of the hollow fiber type ultrafiltration membrane is not limited, but may be, for example, 0.1 to 2 mm. It is preferably 0.8 to 1.4 mm.

The length of the hollow fiber type ultrafiltration membrane is not limited, but may be, for example, 0.05 to 3 m. It is preferably 0.05 to 2 m.

Although the material of the ultrafiltration membrane is not limited, examples thereof include organic materials such as cellulose, cellulose ester, polysulfone, sulfonated polysulfone, polyethersulfone, sulfonated polyethersulfone, chlorinated polyethylene, polypropylene, polyolefin, polyvinyl alcohol, polymethyl methacrylate, polyacrylnitrile, polyvinylidene fluoride, and polytetrafluoroethylene; metals such as stainless steel; and inorganic materials such as ceramics.

The material of the ultrafiltration membrane is preferably an organic material, and it is more preferably chlorinated polyethylene, polypropylene, polyvinylidene fluoride, polytetrafluoroethylene, polyacrylonitrile, polysulfone, or polyethersulfone, and still more preferably polyacrylonitrile or polyvinylidene fluoride.

Specific examples of the above ultrafiltration membrane include the G-5 type, G-10 type, G-20 type, G-50 type, PW type, and HWS UF type from DESAL; HEM-180, HEM-183, HEM-251, HEM-300, HEM-116, HEM-183, HEM-300, HFK-131, HFK-328, MPT-U20, MPS-U20P, and MPS-U20S from KOCH; SPE1, SPE3, SPE5, SPE10, SPE30, SPV5, SPV50, and SOW30 from Synder; the Microza (R) UF series manufactured by Asahi Kasei Corporation; and NTR 7410 manufactured by Nitto Denko Corporation.

The above ultrafiltration is preferably carried out at a pressure of 0.01 MPa or more from the viewpoint of removal efficiency of the dimer and trimer. It is more preferably 0.03 MPa or more, and still more preferably 0.05 MPa or more. Also, from the viewpoint of pressure resistance, the above pressure is preferably 0.5 MPa or less, more preferably 0.25 MPa or less, and still more preferably 0.2 MPa or less.

The above ultrafiltration is preferably carried out at a flow rate of 10 mL/min or more and more preferably carried out at a flow rate of 50 mL/min or more, and also preferably carried out at a flow rate of 5,000 mL/min or less and more preferably carried out at a flow rate of 1,000 mL/min or less, from the viewpoint of removal efficiency of the dimer and trimer.

The above microfiltration can be carried out using a microfiltration membrane. The microfiltration membrane usually has an average pore size of 0.05 to 1.0 µm.

It is preferable that the above microfiltration membrane has an average pore size of 0.1 µm or more, since it can efficiently remove the dimer and trimer. It is more preferably 0.075 µm or more, and still more preferably 0.1 µm or more. In addition, it is preferable that the average pore size is preferably 1.00 µm or less. The average pore size is more preferably 0.50 µm or less, and still more preferably 0.25 µm or less.

The average pore size of the above microfiltration membrane can be measured in conformity with ASTM F316 03 (bubble point method).

Although the shape of the above microfiltration membrane is not limited to those conventionally known, for example, it may be hollow fiber type, flat membrane type, spiral type, tubular type, or the like. The hollow fiber type is preferable from the viewpoint of inhibiting clogging.

The inner diameter of the hollow fiber type microfiltration membrane is not limited, but may be, for example, 0.1 to 2 mm. It is preferably 0.8 to 1.4 mm.

The length of the hollow fiber type microfiltration membrane is not limited, but may be, for example, 0.05 to 3 m. It is preferably 0.05 to 2 m.

Examples of the material of the above microfiltration membrane include cellulosic materials, aromatic polyamide, polyvinyl alcohol, polysulfone, polyethersulfone, polyvinylidene fluoride, polyethylene, polyacrylonitrile, polypropylene, polycarbonate, polytetrafluoroethylene, ceramics, and metals. Among these, aromatic polyamide, polyvinyl alcohol, polysulfone, polyvinylidene fluoride, polyethylene, polyacrylonitrile, polypropylene, polycarbonate, and polytetrafluoroethylene are preferable, and polyacrylonitrile and polyvinylidene fluoride are particularly preferable.

Specific examples of the microfiltration membrane include Cefilt manufactured by NGK Insulators, Ltd.; the Microza U series and Microza P series manufactured by Asahi Kasei Corporation; Poreflon SPMW, Poreflon OPMW, and Poreflon PM manufactured by Sumitomo Electric Industries, Ltd.; Trefil manufactured by Toray Industries, Inc.; NADIR MP005 and NADIR MV020 manufactured by Microdyn-Nadir GmbH; and X-flow manufactured by Norit N.V.

The above microfiltration is preferably carried out at a pressure of 0.01 MPa or more from the viewpoint of removal efficiency of the dimer and trimer. It is more preferably 0.03 MPa or more, and still more preferably 0.05 MPa or more. Also, from the viewpoint of pressure resistance, the above pressure is preferably 0.5 MPa or less, more preferably 0.25 MPa or less, and still more preferably 0.2 MPa or less.

The above microfiltration is preferably carried out at a flow rate of 10 mL/min or more and more preferably carried out at a flow rate of 50 mL/min or more, and also preferably carried out at a flow rate of 5,000 mL/min or less and more preferably carried out at a flow rate of 1,000 mL/min or less, from the viewpoint of removal efficiency of the dimer and trimer.

The above dialysis membrane treatment is carried out using a dialysis membrane. The molecular weight cut-off of the dialysis membrane is usually $0.05 \times 10^4$ to $100 \times 10^4$ Da.

The above dialysis membrane preferably has a molecular weight cut-off of $0.3 \times 10^4$ Da or more, since it can suppress membrane clogging and efficiently remove the dimer and trimer. The above molecular weight cut-off is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The above molecular weight cut-off may be $8.0 \times 10^4$ Da or more.

In addition, the above molecular weight cut-off is preferably $20 \times 10^4$ Da or less, and more preferably $10 \times 10^4$ Da or less, from the viewpoint of removal efficiency of the dimer and trimer.

The molecular weight cut-off of the above dialysis membrane can be measured by, for example, the same method as for the ultrafiltration membrane.

Although the material of the above dialysis membrane is not limited, examples thereof include cellulose, polyacrylonitrile, polymethyl methacrylate, ethylene vinyl alcohol copolymers, polysulfone, polyamide, and polyester polymer alloys.

Specific examples of the dialysis membrane include Spectra/Por (R) Float-A-Lyzer, Tube-A-Lyzer, Dialysis tubing, 6Dialysis tubing, and 7Dialysis tubing manufactured by Spectrum Laboratories Inc.

It is preferable that the above ultrafiltration, microfiltration, or dialysis membrane treatment is carried out at a temperature of 10° C. or higher. It is more preferably 15° C. or higher, still more preferably 20° C. or higher, and particularly preferably 30° C. or higher. By setting the temperature in the above range, the dimer and trimer can be reduced more efficiently. The above temperature is preferably 90° C. or lower, more preferably 80° C. or lower, still more preferably 70° C. or lower, and particularly preferably 60° C. or lower.

The ultrafiltration, microfiltration, or dialysis membrane treatment can be carried out while adding water to the crude composition or while adjusting the pH of the crude composition. Water may be added intermittently to the crude composition or may be added continuously to the crude composition.

The end point of the ultrafiltration, microfiltration, or dialysis membrane treatment may be determined as appropriate and is not limited. In addition, the above ultrafiltration, microfiltration, or dialysis membrane treatment may be backwashed with water about once every 1 to 24 hours of filtration time to improve the durability of the filtration membrane.

By removing the dimer and trimer of the monomer (1) from the crude composition containing the polymer of the monomer (1), an aqueous solution containing the polymer (1) substantially free from the dimer and trimer is usually obtained. The polymer (1) used in the above production method may be a polymer (1) contained in the obtained aqueous solution or a polymer (1) obtained by separation from the aqueous solution. The method for separating the polymer (1) from the aqueous solution is not limited. For example, the polymer (1) can be separated by a method such as coagulation, washing, and drying of the polymer (1) in the aqueous solution.

As the polymer (1), an aqueous solution containing the polymer (1) can be used. The preferred content of the dimer and trimer of the monomer (1) based on the polymer (1) in the aqueous solution is the same as the content of the dimer and trimer in the polymer (1).

In the production method of the present disclosure, the use of at least one type of polymer (1) enables efficient production of the perfluoroelastomer. Also, in the production method of the present disclosure, two or more types of polymers (1) may be used at the same time, or another compound having a surfactant function may also be used in combination insofar as the compound is volatile or is allowed to remain in a crosslinked product containing the perfluoroelastomer or the like.

In the production method of the present disclosure, the above polymerization may be carried out in the presence of a nonionic surfactant. The above nonionic surfactant is preferably at least one selected from the group consisting of:

a compound represented by the general formula (240):

wherein $Rf^{241}$ is a partially fluorinated alkyl group or a fully fluorinated alkyl group having 1 to 12 carbon atoms; n is 0 or 1; $X^{241}$ is —O—, —COO—, or —OCO—; $Y^{241}$ is —$(CH_2)_pH$, —$(CH_2)_pOH$, or —$(OR^{241})_q(OR^{242})_rOH$; p is an integer of 1 to 12; q is an integer of 1 to 12; r is an integer of 0 to 12; and $R^{241}$ and $R^{242}$ are each an alkylene group having 2 to 4 carbon atoms, with the proviso that $R^{241}$ and $R^{242}$ are different from each other;

a block polymer represented by the general formula (250):

wherein $R^{251}$ and $R^{252}$ are each an alkylene group having 1 to 4 carbon atoms; and u and v are each an integer of 1 to 5, with the proviso that $R^{251}$ and $R^{252}$ are different from each other;

a nonionic polymer having a hydrophobic group containing a hydrocarbon group having 8 to 20 carbon atoms and a hydrophilic group containing a polyalkylene oxide in the molecule; and a silicon compound represented by the general formula (260):

wherein $R^{261}$ is an alkyl group having 1 to 12 carbon atoms; $R^{262}$ is an alkyl group having 1 to 4 carbon atoms; and m is an integer of 1 to 3.

Specific examples of the block polymer represented by the general formula (250) include block polymers composed of at least two segments selected from the group consisting of polyoxyethylene, polyoxypropylene, and polyoxybutylene. Examples thereof include polyoxyethylene-polyoxypropylene block polymers and polyoxyethylene-polyoxybutylene block polymers, and not only A-B block polymers but also A-B-A block polymers are preferable. More preferably, the use of a polyoxyethylene-polyoxypropylene block polymer or a polyoxypropylene-polyoxyethylene-polyoxypropylene block polymer allows to prepare a stable perfluoroelastomer dispersion at a high concentration. In addition, the content of the polyoxyethylene segment is preferably 10 to 50% in view of reducing generation of agglomerates considered to be caused by re-agglomeration, and more preferably 20 to 40% because it allows for the preparation of a perfluoroelastomer dispersion with a low viscosity. The polyoxyethylene segment may have a molecular weight of, but not limited to, 1,000 to 7,000 g/mol, and in particular, the use of a polyoxyethylene segment having a molecular weight of 2,500 to 6,500 g/mol allows to prepare a dispersion having a low viscosity and excellent dispersibility.

In the production method of the present disclosure, a compound having a functional group capable of reacting by radical polymerization and a hydrophilic group may be used together with the polymer (1). Examples of the above "functional group capable of reacting by radical polymerization" include groups having an unsaturated bond, such as a vinyl group or an allyl group.

Examples of the above hydrophilic group include —$NH_2$, —$PO_3M$, —$OPO_3M$, —$SO_3M$, —$OSO_3M$, and —$COOM$ (in each formula, M represents H, $NH_4$, or an alkali metal). Of these, —$SO_3M$ or —$COOM$ is preferable as the above hydrophilic group. Examples of the above alkali metal include Na and K.

Examples of the above compound having a functional group capable of reacting by radical polymerization and a hydrophilic group include:

a compound represented by the general formula (270a):

wherein n271a represents an integer of 1 to 10; $Y^{271}$ represents —$SO_3M^{271}$ or —$COOM^{271}$; and $M^{271}$ represents H, $NH_4$, or an alkali metal;

a compound represented by the general formula (270b):

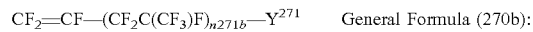

wherein n271b represents an integer of 1 to 5; and $Y^{271}$ is as defined above;

a compound represented by the general formula (270c):

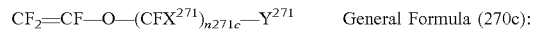

wherein $X^{271}$ represents F or $CF_3$; n271c represents an integer of 1 to 10; and $Y^{271}$ is as defined above;

a compound represented by the general formula (270d):

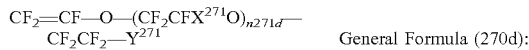
General Formula (270d):

wherein n271d represents an integer of 1 to 10; and $Y^{271}$ and $X^{271}$ are as defined above; and a compound represented by the general formula (270e):

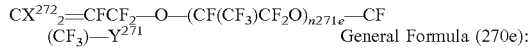
General Formula (270e):

wherein each $X^{272}$ is the same and represents F or H; n271e represents an integer of 0 or 1 to 10; and $Y^{271}$ is as defined above.

The production method of the present disclosure is preferably one in which the polymerization of the perfluoromonomer is carried out substantially in the absence of a fluorine-containing surfactant (except for the compound having a functional group capable of reacting by radical polymerization and a hydrophilic group).

Conventionally, a fluorine-containing surfactant has been used for polymerization of perfluoromonomers, but the production method of the present disclosure allows for, by using the polymer (1), polymerization of the perfluoromonomer to obtain the perfluoroelastomer without the use of a fluorine-containing surfactant.

In the present disclosure, the expression "substantially in the absence of a fluorine-containing surfactant" means that the content of the fluorine-containing surfactant (except for the compound having a functional group capable of reacting by radical polymerization and a hydrophilic group) based on the aqueous medium is 10 ppm by mass or less, and the content of the fluorine-containing surfactant is preferably 1 ppm by mass or less, more preferably 100 ppb by mass or less, still more preferably 10 ppb by mass or less, and particularly preferably 1 ppb by mass or less.

Examples of the above fluorine-containing surfactant include an anionic fluorine-containing surfactant.

The above anionic fluorine-containing surfactant may be, for example, a fluorine atom-containing surfactant having, in the portion excluding the anionic group, 20 or less carbon atoms in total.

Alternatively, the above fluorine-containing surfactant may be a fluorine-containing surfactant having an anionic moiety having a molecular weight of 800 or less.

Note that the above "anionic moiety" refers to the portion of the above fluorine-containing surfactant excluding the cation. For example, in the case of $F(CF_2)_{n1}COOM$ represented by the formula (I), which will be mentioned later, the anionic moiety refers to the portion "$F(CF_2)_{n1}COO$".

Examples of the above fluorine-containing surfactant also include a fluorine-containing surfactant having a Log POW of 3.5 or less. The above Log POW is the partition coefficient between 1-octanol and water and is represented by Log P [where P is the ratio of the concentration of fluorine-containing surfactant in octanol to the concentration of fluorine-containing surfactant in water when a mixed octanol/water (1:1) solution containing the fluorine-containing surfactant is phase-separated].

The above Log POW is obtained by performing HPLC on standard substances with known octanol/water partition coefficients (heptanoic acid, octanoic acid, nonanoic acid, and decanoic acid) under the following conditions: column; TOSOH ODS-120T column (ϕ4.6 mm×250 mm, Tosoh Corporation), eluent; acetonitrile/0.6 mass % $HClO_4$ water=1/1 (vol/vol %), flow rate; 1.0 ml/min, sample volume; 300 μL, column temperature; 40° C., detection light; UV 210 nm, preparing a calibration curve between each elution time and the known octanol/water partition coefficients, and calculating from the elution time in HPLC for the sample liquid based on this calibration curve.

Specific examples of the above fluorine-containing surfactant include those described in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/0142541, U.S. Patent Application Publication No. 2008/0015319, U.S. Pat. Nos. 3,250,808, 3,271,341, Japanese Patent Laid-Open No. 2003-119204, International Publication No. WO 2005/042593, International Publication No. WO 2008/060461, International Publication No. WO 2007/046377, International Publication No. WO 2007/119526, International Publication No. WO 2007/046482, International Publication No. WO 2007/046345, U.S. Patent Application Publication No. 2014/0228531, International Publication No. WO 2013/189824, and International Publication No. WO 2013/189826.

Examples of the above anionic fluorine-containing surfactant include a compound represented by the following general formula ($N^0$):

($N^0$)

wherein $X^{n0}$ is H, Cl, or F; $Rf^{n0}$ is a linear, branched, or cyclic alkylene group having 3 to 20 carbon atoms in which some or all of H is replaced by F, where the alkylene group may contain one or more ether bonds and some H may be replaced by Cl; and $Y^0$ is an anionic group.

The anionic group of $Y^0$ may be $-COOM$, $-SO_2M$, or $-SO_3M$, and may be $-COOM$ or $-SO_3M$.

M is H, a metal atom, $NR^7_4$, imidazolium optionally having a substituent, pyridinium optionally having a substituent, or phosphonium optionally having a substituent and $R^7$ is $-H$ or an organic group.

Examples of the above metal atom include alkali metals (Group 1) and alkaline earth metals (Group 2), and it is Na, K, or Li, for example.

$R^7$ may be $-H$ or a $C_{1-10}$ organic group, may be $-H$ or a $C_{1-4}$ organic group, and may be $-H$ or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

The above $Rf^{n0}$ may be one in which 50% or more of H is replaced by fluorine.

Examples of the compound represented by the above general formula ($N^0$) include:

a compound represented by the following general formula ($N^1$):

($N^1$)

wherein $X^{n0}$ is H, Cl, or F; m1 is an integer of 3 to 15; and $Y^0$ is as defined above;

a compound represented by the following general formula ($N^2$):

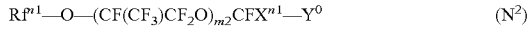
($N^2$)

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

($N^3$)

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}-O-(CY^{n1}Y^{n2})_pCF_2-Y^0 \quad (N^4)$$

wherein $Rf^{n4}$ is a partially or fully fluorinated, linear or branched alkyl group having 1 to 12 carbon atoms and optionally containing an ether bond; $Y^{n1}$ and $Y^{n2}$ are the same as or different from each other, and are each H or F; p is 0 or 1; and $Y^0$ is as defined above; and a compound represented by the following general formula ($N^5$):

wherein $X^{n2}$, $X^{n3}$, and $X^{n4}$ are the same as or different from each other, and are each H, F, or a partially or fully fluorinated, linear or branched alkyl group having 1 to 6 carbon atoms and optionally containing an ether bond; $Rf^{n5}$ is a partially or fully fluorinated, linear or branched alkylene group having 1 to 3 carbon atoms and optionally containing an ether bond; L is a linking group; and $Y^0$ is as defined above, with the proviso that the total number of carbon atoms in $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylenesulfonic acid (VIII) represented by the following general formula (VIII), an alkylalkylenecarboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The above perfluorocarboxylic acid (I) is one represented by the following general formula (I):

$$F(CF_2)_{n1}COOM \quad (I)$$

wherein n1 is an integer of 3 to 14; M is H, a metal atom, $NR^7_4$, imidazolium optionally having a substituent, pyridinium optionally having a substituent, or phosphonium optionally having a substituent; and $R^7$ is —H or an organic group.

The above ω-H perfluorocarboxylic acid (II) is one represented by the following general formula (II):

$$H(CF_2)_{n2}COOM \quad (II)$$

wherein n2 is an integer of 4 to 15 and M is as defined above.

The above perfluoropolyethercarboxylic acid (III) is one represented by the following general formula (III):

$$Rf^1-O-(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The above perfluoroalkylalkylenecarboxylic acid (IV) is one represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The above alkoxyfluorocarboxylic acid (V) is one represented by the following general formula (V):

$$Rf^4-O-CY^1Y^2CF_2-COOM \quad (V)$$

wherein $Rf^4$ is a partially or fully fluorinated, linear or branched alkyl group having 1 to 12 carbon atoms and optionally containing an ether bond; $Y^1$ and $Y^2$ are the same as or different from each other, and are each H or F; and M is as defined above.

The above perfluoroalkylsulfonic acid (VI) is one represented by the following general formula (VI):

$$F(CF_2)_{n5}SO_3M \quad (VI)$$

wherein n5 is an integer of 3 to 14 and M is as defined above.

The above ω-H perfluorosulfonic acid (VII) is one represented by the following general formula

$$H(CF_2)_{n6}SO_3M \quad (VII)$$

wherein n6 is an integer of 4 to 14 and M is as defined above.

The above perfluoroalkylalkylenesulfonic acid (VIII) is one represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The above alkylalkylenecarboxylic acid (IX) is one represented by the following general formula (IX):

$$Rf^6(CH_2)_{n8}COOM \quad (IX)$$

wherein $Rf^6$ is a partially or fully fluorinated, linear or branched alkyl group having 1 to 13 carbon atoms and optionally containing an ether bond; n8 is an integer of 1 to 3; and M is as defined above.

The above fluorocarboxylic acid (X) is one represented by the following general formula (X):

$$Rf^7-O-Rf^8-O-CF_2-COOM \quad (X)$$

wherein $Rf^7$ is a partially or fully fluorinated, linear or branched alkyl group having 1 to 6 carbon atoms and optionally containing an ether bond; $Rf^8$ is a partially or fully fluorinated, linear or branched alkyl group having 1 to 6 carbon atoms; and M is as defined above.

The above alkoxyfluorosulfonic acid (XI) is one represented by the following general formula (XI):

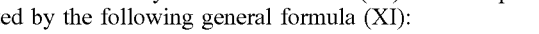

$$Rf^9-O-CY^1Y^2CF_2-SO_3M \quad (XI)$$

wherein $Rf^9$ is a partially or fully fluorinated, linear or branched alkyl group having 1 to 12 carbon atoms, optionally containing an ether bond, and optionally containing chlorine; $Y^1$ and $Y^2$ are the same as or different from each other, and are each H or F; and M is as defined above.

The above compound (XII) is one represented by the following general formula (XII):

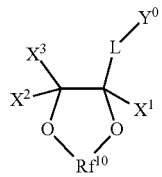

wherein $X^1$, $X^2$, and $X^3$ are the same as or different from each other, and are each H, F, or a partially or fully fluorinated, linear or branched alkyl group having 1 to 6 carbon atoms and optionally containing an ether bond; $Rf^{10}$ is a perfluoroalkylene group having 1 to 3 carbon atoms; L is a linking group; $Y^0$ is an anionic group.

$Y^0$ may be —COOM, —$SO_2$M, or —$SO_3$M, and may be —$SO_3$M or —COOM, where M is as defined above.

Examples of L include a single bond and a partially or fully fluorinated alkylene group having 1 to 10 carbon atoms and optionally containing an ether bond.

The above compound (XIII) is one represented by the following general formula (XIII):

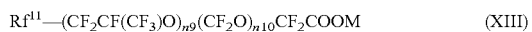

wherein $Rf^{11}$ is a fluoroalkyl group having 1 to 5 carbon atoms and containing chlorine; n9 is an integer of 0 to 3; n10 is an integer of 0 to 3; and M is as defined above. Examples of the compound (XIII) include $CF_2ClO(CF_2CF(CF_3)O)_{n9}(CF_2O)_{n10}CF_2COONH_4$ (a mixture with an average molecular weight of 750, wherein n9 and n10 are as described above).

In the production method of the present disclosure, in addition to the polymer (1), an additive may also be used to stabilize the compounds. Examples of the above additive include a buffer, a pH adjuster, a stabilizing aid, and a dispersion stabilizer.

In the production method of the present disclosure, the polymerization is carried out by charging a polymerization reactor with an aqueous medium, the polymer (1), perfluoromonomers, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the polymer (1) may additionally be added depending on the purpose. The polymer (1) may be added after the polymerization reaction is initiated.

The above polymerization is usually performed at a polymerization temperature of 5 to 120° C. and a polymerization pressure of 0.05 to 10 MPaG. The polymerization temperature and the polymerization pressure are determined as appropriate in accordance with the types of the monomers used, the molecular weight of the target perfluoroelastomer, and the reaction rate.

In the production method of the present disclosure, the polymerization may be carried out in the presence of a polymerization initiator.

The polymerization initiator is not limited as long as it is capable of generating radicals in the above polymerization temperature range, and known oil-soluble and/or water-soluble polymerization initiators can be used. Furthermore, the polymerization can also be initiated as redox in combination with a reducing agent or the like. The concentration of the above polymerization initiator is determined as appropriate in accordance with the types of monomers, the molecular weight of the target perfluoroelastomer, and the reaction rate.

As the above polymerization initiator, an oil-soluble radical polymerization initiator or a water-soluble radical polymerization initiator can be used.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl) peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, organic peroxides such as disuccinic acid peroxide and diglutaric acid peroxide, t-butyl permaleate, and t-butyl hydroperoxide. A reducing agent such as a sulfite or sulfite salt may also be contained in combination, and it may be used in an amount 0.1 to 20 times that of the peroxide.

For example, in the case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. In order to increase the decomposition rate of the initiator, the combination of the redox initiator may preferably contain a copper salt or an iron salt. Examples of the copper salt include copper(II) sulfate and examples of the iron salt include iron(II) sulfate.

Examples of the above redox initiator include potassium permanganate/oxalic acid, ammonium persulfate/bisulfite/iron sulfate, manganese triacetate/oxalic acid, cerium ammonium nitrate/oxalic acid, and bromate/bisulfite, and potassium permanganate/oxalic acid is preferable. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

The amount of the polymerization initiator added is preferably 0.0001 to 10% by mass, and more preferably 0.01 to 5% by mass, based on 100% by mass of the perfluoromonomer. When the amount of the polymerization initiator added in the above polymerization (the amount present) is within the above range, the polymerization reaction of the perfluoromonomer progresses smoothly and the perfluoroelastomer can be produced efficiently. When the amount of the polymerization initiator added is too small, a sufficient polymerization rate cannot be obtained or a sufficient yield cannot be obtained.

The timing of addition of the polymerization initiator in the above polymerization is not limited, and it may be added before the initiation of the polymerization or may be added after the initiation of the polymerization. In addition, in the above polymerization, the polymerization initiator may be added all at once at an arbitrary timing, or it may be added continuously. Adding the polymerization initiator continuously means, for example, adding the polymerization initiator not all at once, but adding over time and without interruption or adding in portions. When the polymerization initiator is added continuously, it is preferable to add the polymerization initiator such that the total amount of the polymerization initiator added is in the range described above. When the polymerization initiator is added, an aqueous solution containing the polymerization initiator and water may be prepared and that aqueous solution may be added.

The above aqueous medium is a reaction medium in which the polymerization is carried out, and means a liquid containing water. The above aqueous medium is not limited as long as it contains water, and it may be one containing water and, for example, any of fluorine-free organic solvents such as alcohols, ethers, and ketones, and/or fluorine-containing organic solvents having a boiling point of 40° C. or lower.

In the above polymerization, a known chain transfer agent may be further added to adjust the polymerization rate and the molecular weight depending on the purpose.

In the above polymerization, an iodine compound or bromine compound can also be used as a chain transfer agent from the viewpoint that the resulting polymer has a narrow molecular weight distribution, the molecular weight can be easily controlled, and an iodine atom or bromine atom can be introduced at its terminals. Examples of the polymerization method using an iodine compound or bromine compound include a method in which the polymerization is carried out in an aqueous medium under pressure in the presence of an iodine compound or bromine compound under the substantially oxygen-free state ("iodine transfer polymerization method"). Representative examples of the iodine compound or bromine compound used include a compound represented by the general formula:

$$R^{21}I_xBr_y$$

wherein x and y are each an integer of 0 to 2 and satisfy $1 \leq x+y \leq 2$; and $R^{21}$ is a saturated or unsaturated fluorohydrocarbon group or chlorofluorohydrocarbon group having 1 to 16 carbon atoms, or a hydrocarbon group having 1 to 3 carbon atoms, and optionally contains an oxygen atom. By using the iodine compound or bromine compound, an iodine atom or bromine atom is introduced into the polymer and functions as a crosslinking point.

Examples of the iodine compound or bromine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Of these, it is preferable to use 1,4-diiodoperfluorobutane, 1,6-diiodoperfluorohexane, and 2-iodoperfluoropropane from the viewpoint of polymerization reactivity, crosslinking reactivity, ease of availability, and the like.

Examples of the chain transfer agent also include esters such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The amount of the chain transfer agent added is usually 1 to 50,000 ppm by mass, preferably 1 to 20,000 ppm by mass, based on the total amount of the perfluoromonomer fed.

The chain transfer agent may be added to the reaction vessel at once before initiation of the polymerization, may be added at once after initiation of the polymerization, may be added in multiple portions during the polymerization, or may be added continuously during the polymerization.

In the method for producing a perfluoroelastomer of the present disclosure, polymerization of a perfluoromonomer is carried out in an aqueous medium to provide a perfluoroelastomer. The fluoropolymer obtained by the production method of the present disclosure is a perfluoroelastomer, not a partially fluorinated elastomer.

It is preferable that the perfluoromonomer is at least one selected from the group consisting of:
tetrafluoroethylene [TFE];
hexafluoropropylene [HFP];
a fluoromonomer represented by the general formula (13):

$$CF_2=CF-ORf^{13} \quad \text{General Formula (13):}$$

wherein $Rf^{13}$ represents a perfluoroalkyl group having 1 to 8 carbon atoms;
a fluoromonomer represented by the general formula (14):

$$CF_2=CFOCF_2ORf^{14} \quad \text{General Formula (14):}$$

wherein $Rf^{14}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms; and
a fluoromonomer represented by the general formula (15):

$$CF_2=CFO(CF_2CF(Y^{15})O)_m(CF_2)_nF \quad \text{General Formula (15):}$$

wherein $Y^{15}$ represents a fluorine atom or a trifluoromethyl group; m is an integer of 1 to 4; and n is an integer of 1 to 4.

Also, in the polymerization of the perfluoromonomer, a monomer that provides a crosslinking site may be polymerized together with the perfluoromonomer.

Examples of the monomer that provides a crosslinking site include a monomer represented by the general formula (16):

$$CX^4{}_2=CX^5Rf^{15}X^6 \qquad \text{General Formula (16):}$$

wherein $X^4$ and $X^5$ are each independently H, F, or an alkyl group having 1 to 5 carbon atoms; $Rf^{15}$ is a linear or branched alkylene group or oxyalkylene group in which some or all of the hydrogen atoms may be replaced by fluorine atoms, optionally having one or more oxygen atoms derived from ether bonds and optionally having an aromatic ring; and $X^6$ is an iodine atom, a bromine atom, a cyano group, a carboxyl group, an alkoxycarbonyl group, a hydroxyl group, a vinyl group, an azide group, a sulfonyl azide group, a carbonyl azide group, or an alkyne group. The alkyne group may be an ethynyl group.

Among the above, the monomer that provides a crosslinking site is preferably at least one selected from the group consisting of:

a fluoromonomer represented by the general formula (17):

$$CX^{16}{}_2=CX^{16}—Rf^{16}CHR^{16}X^{17} \qquad \text{General Formula (17):}$$

wherein $X^{16}$ is each independently a hydrogen atom, a fluorine atom, or $CH_3$; $Rf^{16}$ is a fluoroalkylene group, a perfluoroalkylene group, a fluoro(poly)oxyalkylene group, or a perfluoro(poly)oxyalkylene group; $R^{16}$ is a hydrogen atom or $CH_3$; and $X^{17}$ is an iodine atom or a bromine atom;

a fluoromonomer represented by the general formula (18):

$$CX^{16}{}_2=CX^{16}—Rf^{17}X^{17} \qquad \text{General Formula (18):}$$

wherein $X^{16}$ is each independently a hydrogen atom, a fluorine atom, or $CH_3$; $Rf^{17}$ is a fluoroalkylene group, a perfluoroalkylene group, a fluoro(poly)oxyalkylene group, or a perfluoro(poly)oxyalkylene group; and $X^{17}$ is an iodine atom or a bromine atom;

a fluoromonomer represented by the general formula (19):

$$CF_2=CFO(CF_2CF(CF_3)O)_m(CF_2)_n—X^{18} \qquad \text{General Formula (19):}$$

wherein m is an integer of 0 to 5; n is an integer of 1 to 3; and $X^{18}$ is a cyano group, an azide group, a sulfonyl azide group, a carbonyl azide group, a carboxyl group, an alkoxycarbonyl group, an alkyne group, an iodine atom, a bromine atom, or $CH_2I$;

a fluoromonomer represented by the general formula (20):

$$CH_2=CFCF_2O(CF(CF_3)CF_2O)_m(CF(CF_3))_n—X^{19} \qquad \text{General Formula (20):}$$

wherein m is an integer of 0 to 5; n is an integer of 1 to 3; and $X^{19}$ is a cyano group, a carboxyl group, an alkoxycarbonyl group, an iodine atom, a bromine atom, or $CH_2OH$; and a monomer represented by the general formula (21):

$$CR^{20}{}_2=CR^{20}—Z^{20}—CR^{20}=CR^{20}{}_2 \qquad \text{General Formula (21):}$$

wherein $R^{20}$ is each independently a hydrogen atom or an alkyl group having 1 to 5 carbon atoms; and $Z^{20}$ is a linear or branched alkylene group having 1 to 18 carbon atoms and optionally having an oxygen atom, a cycloalkylene group having 3 to 18 carbon atoms, an at least partially fluorinated alkylene group or oxyalkylene group having 1 to 10 carbon atoms, or a (per) fluoropolyoxyalkylene group represented by:

$$-(Q)_p-CF_2O—(CF_2CF_2O)_m(CF_2O)_n—CF_2-(Q)_p-$$

where Q is an alkylene group or an oxyalkylene group; p is 0 or 1; and m/n is 0.2 to 5, and having a molecular weight of 500 to 10,000.

$X^{16}$ is preferably a fluorine atom. $Rf^{16}$ and $Rf^{17}$ are each preferably a perfluoroalkylene group having 1 to 5 carbon atoms. $R^{16}$ is preferably a hydrogen atom. $X^{18}$ is preferably a cyano group, an alkoxycarbonyl group, an iodine atom, a bromine atom, or —$CH_2I$. $X^{19}$ is preferably a cyano group, an alkoxycarbonyl group, an iodine atom, a bromine atom, or —$CH_2OH$.

The monomer that provides a crosslinking site is preferably at least one selected from the group consisting of $CF_2=CFOCF_2CF(CF_3)OCF_2CF_2CN$, $CF_2=CFOCF_2CF(CF_3)OCF_2CF_2COOH$, $CF_2=CFOCF_2CF(CF_3)OCF_2CF_2CH_2I$, $CF_2=CFOCF_2CF_2CH_2I$, $CH_2=CFCF_2OCF(CF_3)CF_2OCF(CF_3)CN$, $CH_2=CFCF_2OCF(CF_3)CF_2OCF(CF_3)COOH$, $CH_2=CFCF_2OCF(CF_3)CF_2OCF(CF_3)CH_2OH$, $CH_2=CHCF_2CF_2I$, $CH_2=CH(CF_2)_2CH=CH_2$, $CH_2=CH(CF_2)_6CH=CH_2$, and $CF_2=CFO(CF_2)_5CN$, and it is more preferably at least one selected from the group consisting of $CF_2=CFOCF_2CF(CF_3)OCF_2CF_2CN$ and $CF_2=CFOCF_2CF_2CH_2I$.

The polymerization of the perfluoromonomer or of the perfluoranonomer and the monomer that provides a crosslinking site can be carried out to provide a perfluoroelastomer.

The perfluoroelastomer is preferably at least one selected from the group consisting of perfluoroelastomers comprising TFE units, such as a copolymer of TFE/fluoromonomer represented by the general formula (13), (14), or (15) and a copolymer of TFE/fluoromonomer represented by the general formula (13), (14), or (15)/monomer that provides a crosslinking site.

When the perfluoroelastomer is a TFE/perfluoro(methyl vinyl ether) (PMVE) copolymer, it has compositional features of preferably 45 to 90/10 to 55 (mol %), more preferably 55 to 80/20 to 45, and still more preferably 55 to 70/30 to 45.

When the perfluoroelastomer is a copolymer of TFE/PMVE/monomer that provides a crosslinking site, it has compositional features of preferably 45 to 89.9/10 to 54.9/0.01 to 4 (mol %), more preferably 55 to 77.9/20 to 49.9/0.1 to 3.5, and still more preferably 55 to 69.8/30 to 44.8/0.2 to 3.

When the perfluoroelastomer is a copolymer of TFE/fluoromonomer represented by the general formula (13), (14), or (15) having 4 to 12 carbon atoms, it has compositional features of preferably 50 to 90/10 to 50 (mol %), more preferably 60 to 88/12 to 40, and still more preferably 65 to 85/15 to 35.

When the perfluoroelastomer is a copolymer of TFE/fluoromonomer represented by the general formula (13), (14), or (15) having 4 to 12 carbon atoms/monomer that provides a crosslinking site, it has compositional features of preferably 50 to 89.9/10 to 49.9/0.01 to 4 (mol %), more preferably 60 to 87.9/12 to 39.9/0.1 to 3.5, and still more preferably 65 to 84.8/15 to 34.8/0.2 to 3.

Outside of these ranges of compositional features, the perfluoroelastomer tends to lose its properties as a rubber elastic material and to become more like a resin.

The perfluoroelastomer is preferably at least one selected from the group consisting of a copolymer of TFE/fluoromonomer represented by the general formula (15)/monomer that provides a crosslinking site, a copolymer of TFE/fluoromonomer represented by the general formula (15), a copolymer of TFE/fluoromonomer represented by the general formula (13), and a copolymer of TFE/fluoromonomer represented by the general formula (13)/monomer that provides a crosslinking site.

Examples of the perfluoroelastomer may also include those described in International Publication No. WO 97/24381, Japanese Patent Publication No. 61-57324, Japanese Patent Publication No. 4-81608, Japanese Patent Publication No. 5-13961, and the like.

The perfluoroelastomer preferably has a glass transition temperature of −70° C. or higher, more preferably −60° C. or higher, and still more preferably −50° C. or higher, from the viewpoint of excellent compression set resistance at a high temperature. Also, it preferably has a glass transition temperature of 5° C. or lower, more preferably 0° C. or lower, and still more preferably −3° C. or lower, from the viewpoint of good low-temperature resistance.

By using a differential scanning calorimeter (manufactured by Mettler-Toledo, DSC822e) and increasing the temperature of 10 mg of the sample at 10° C./min, a DSC curve is obtained, and then the temperature indicating the midpoint of the two intersections between the extension line of the baseline before and after the secondary transition of the DSC curve and the tangent line at the inflection point of the DSC curve is determined and used as the above glass transition temperature.

The perfluoroelastomer preferably has a Mooney viscosity ML (1+20) at 170° C. of 30 or more, more preferably 40 or more, and still more preferably 50 or more, from the viewpoint of good heat resistance. Also, it preferably has a Mooney viscosity of 150 or less, more preferably 120 or less, and still more preferably 110 or less, from the viewpoint of good processability.

The perfluoroelastomer preferably has a Mooney viscosity ML (1+20) at 140° C. of 30 or more, more preferably 40 or more, and still more preferably 50 or more, from the viewpoint of good heat resistance. Also, it preferably has a Mooney viscosity of 180 or less, more preferably 150 or less, and still more preferably 110 or less, from the viewpoint of good processability.

The perfluoroelastomer preferably has a Mooney viscosity ML (1++10) at 100° C. of 10 or more, more preferably 20 or more, and still more preferably 30 or more, from the viewpoint of good heat resistance. Also, it preferably has a Mooney viscosity of 120 or less, more preferably 100 or less, and still more preferably 80 or less, from the viewpoint of good processability.

The above Mooney viscosity can be measured in accordance with JIS K6300 at 170° C., 140° C., or 100° C. using a Mooney viscometer MV2000E model manufactured by ALPHA TECHNOLOGIES.

The perfluoroelastomer obtained by the production method of the present disclosure may be in any form as long as it is obtainable by the above polymerization, and it may be an aqueous dispersion as polymerized, or may be used in the form of a gum or a crumb obtained by conventionally known coagulation, washing, drying, and any other treatment on the aqueous dispersion as polymerized. The polymer (1) used in the polymerization also contributes to improving the stability of the aqueous dispersion. Accordingly, in the production method of the present disclosure, the polymerization reaction progresses stably even when an initiator such as an organic peroxide is used during the polymerization, and even when a water-insoluble substance such as an iodine compound or bromine compound is added as the chain transfer agent.

The gum refers to a small, granular mass made of the perfluoroelastomer. The crumb refers to an irregularly shaped mass of the perfluoroelastomer as a result of its inability to retain the small granular form as the gum at room temperature, thereby fusing together.

The polymer (1), decomposition products and by-products of the polymer (1) by-produced from the polymer (1), residual monomers, and the like may be collected from discharge water generated in the above coagulation or washing and/or from off gas generated in the drying, and then purified to reuse the polymer (1), the decomposition products and by-products of the polymer (1) by-produced from the polymer (1), the residual monomers, and the like. Although the method for carrying out the above collection and purification is not limited, it may be carried out by a known method. For example, it can be performed by the method described in Japanese Translation of PCT International Application Publication No. 2011-520020.

Although the method for collecting and purifying the polymer (1), the decomposition products and by-products of the polymer (1) by-produced from the polymer (1), the residual monomers, and the like from discharge water generated in the above coagulation, discharge water generated in the washing, and off gas generated in the drying is not limited, a conventionally known method can be adopted. Examples thereof include those described in U.S. Patent Application Publication No. 2007/0015937, U.S. Patent Application Publication No. 2007/0025902, and U.S. Patent Application Publication No. 2007/0027251, and specific examples thereof include the following methods.

Examples of the method for collecting the polymer (1), the decomposition products and by-products of the polymer (1) by-produced from the polymer (1), the residual monomers, and the like from the above discharge water include a method in which the discharge water is brought into contact with adsorbent particles famed of ion exchange resin, activated carbon, silica gel, clay, zeolite, or the like, so that the particles are allowed to adsorb the polymer (1) and the others and the discharge water and the adsorbent particles are then separated. By incinerating the adsorbent particles that have adsorbed the polymer (1) and the others, release of the polymer (1) and the others to the environment can be prevented.

Alternatively, the polymer (1) and the others can be collected by removing and eluting the polymer (1) and the others from the ion exchange resin particles that have adsorbed the polymer (1) and the others by a known method. For example, when the ion exchange resin particles are anion exchange resin particles, the polymer (1) and the others can be eluted by bringing a mineral acid into contact with the anion exchange resin. Subsequently, when a water-soluble organic solvent is added to the resulting eluate, it is usually separated into two phases, and therefore, by collecting and neutralizing the lower phase, which contains the polymer (1) and the others, the polymer (1) and the others can be collected. Examples of the above water-soluble organic solvent include polar solvents such as alcohols, ketones, and ethers.

Other examples of the method for collecting the polymer (1) and the others from the ion exchange resin particles include a method using an ammonium salt and a water-soluble organic solvent, and a method using an alcohol and, if desired, an acid. In the latter method, ester derivatives of the polymer (1) and the others are produced, and thus, they can easily be separated from the alcohol by distillation.

When the above discharge water contains perfluoroelastomer particles and other solids, it is preferable that they are removed before the discharge water and the adsorbent particles are brought into contact with each other. Examples of the method for removing the perfluoroelastomer particles and other solids include a method of adding an aluminum salt or the like to deposit these components, and then separating the discharge water and the deposits, and an electrocoagulation method. They may also be removed by a mechanical method, such as a crossflow filtration method, a deep bed filtration method, or a precoat filtration method.

The concentration of the above perfluoroelastomer that has not yet been agglomerated in the above discharge water is preferably low, more preferably less than 0.4% by mass, and particularly preferably less than 0.3% by mass, from the viewpoint of productivity.

Examples of the method for collecting the polymer (1) and the others from the above off gas include a method in which a scrubber is used and brought into contact with deionized water, an alkaline aqueous solution, an organic solvent such as a glycol ether solvent, or the like to provide a scrubber solution containing the polymer (1) and the others. When an alkaline aqueous solution with a high concentration is used as the alkaline aqueous solution, the scrubber solution can be collected with the polymer (1) and the others in a phase-separated state, making it easy to collect and reuse the above polymer (1) and the others. Examples of the alkali compound include alkali metal hydroxides and quaternary ammonium salts.

The scrubber solution containing the polymer (1) and the others may be concentrated using a reverse osmosis membrane or the like. The concentrated scrubber solution usually contains fluorine ions, but by further adding alumina after the concentration to remove the fluorine ions, it is also possible to facilitate the reuse of the polymer (1) and the others. Alternatively, adsorbent particles may be brought into contact with the scrubber solution to adsorb the polymer (1) and the others, thereby collecting the polymer (1) and the others by the method mentioned above.

The polymer (1) and the others collected by any of the above methods can be reused for production of the perfluoroelastomer.

Next, the method for producing a crosslinkable composition of the present disclosure will be specifically described.

In the method for producing a crosslinkable composition of the present disclosure, after obtaining a perfluoroelastomer by the production method mentioned above, the crosslinkable composition is obtained by mixing the perfluoroelastomer and at least one selected from the group consisting of an inorganic nitride, an organotin compound, an ammonia-generating compound, and a cross-linking agent. From the crosslinkable composition obtained by the production method of the present disclosure, a crosslinked product can be easily obtained. In addition, the crosslinkable composition obtained by the production method of the present disclosure is superior in that it is substantially free from a surfactant and can be easily crosslinked.

The inorganic nitride is not limited, but examples thereof include silicon nitride ($Si_3N_4$), lithium nitride, titanium nitride, aluminum nitride, boron nitride, vanadium nitride, and zirconium nitride. Among these, silicon nitride is preferable because it can supply nano-sized fine particles.

Examples of the organotin compound include tetraphenyltin and triphenyltin.

As the ammonia-generating compound, a compound that generates ammonia at 40 to 330° C. is preferable.

As the ammonia-generating compound, preferred is urea or a derivative thereof, or an ammonium salt, more preferred is urea or an ammonium salt, and still more preferred is urea. The ammonium salt may be either an organic ammonium salt or an inorganic ammonium salt. Also, the ammonia-generating compound may be one that reacts with a minute amount of water to generate ammonia.

Examples of the derivative of urea include biurea, thiourea, urea hydrochloride, and biuret.

Examples of the organic ammonium salt include the compounds described in Japanese Patent Laid-Open No. 9-111081, International Publication No. WO 00/09603, and International Publication No. WO 98/23675, including ammonium salts of polyfluorocarboxylic acids such as ammonium perfluorohexanoate and ammonium perfluorooctanoate; ammonium salts of polyfluorosulfonic acids such as ammonium perfluorohexanesulfonate and ammonium perfluorooctanesulfonate; ammonium salts of polyfluoroalkyl group-containing phosphoric acids or phosphonic acids such as ammonium perfluorohexanephosphate and ammonium perfluorooctanephosphate; and ammonium salts of non-fluorinated carboxylic or sulfonic acids such as ammonium benzoate, ammonium adipate, and ammonium phthalate.

Examples of the inorganic ammonium salt include the compounds described in Japanese Patent Laid-Open No. 9-111081, such as ammonium sulfate, ammonium carbonate, ammonium nitrate, and ammonium phosphate.

In addition, examples of the ammonia-generating compound also include acetaldehyde ammonia, hexamethylenetetramine, formamidine, formamidine hydrochloride, formamidine acetate, t-butyl carbamate, benzyl carbamate, $HCF_2CF_2CH(CH_3)OCONH_2$, and phthalamide.

Examples of the cross-linking agent include cross-linking agents used in peroxide crosslinking, polyol crosslinking, polyamine crosslinking, triazine crosslinking, oxazole crosslinking, imidazole crosslinking, and thiazole crosslinking.

The cross-linking agent used in peroxide crosslinking may be any organic peroxide that can easily generate peroxy radicals in the presence of heat or a redox system, and specific examples thereof may include 1,1-bis(t-butylperoxy)-3,5,5-trimethylcyclohexane, 2,5-dimethylhexane-2,5-dihydroperoxide, di-t-butyl peroxide (PERBUTYL D), t-butyl cumyl peroxide (PERBUTYL C), dicumyl peroxide (PERCUMYL D, PERCUMYL D-40, PERCUMYL D-40MB(T)), α,α-bis(t-butylperoxy)-p-diisopropylbenzene, 2,5-dimethyl-2,5-di(t-butylperoxy)hexane (PERHEXA 25B, PERHEXA 25B-40), 2,5-dimethyl-2,5-di(t-butylperoxy)-hexyne-3 (PERHEXYNE 25B, PERHEXYNE 25B-40), benzoyl peroxide, t-butylperoxybenzene, 2,5-dimethyl-2,5-di(benzoylperoxy)hexane (PERHEXA 25Z), t-butyl peroxymaleate (t-butyl MA), t-butyl peroxyisopropylcarbonate (PERBUTYL I-75), methyl ethyl ketone peroxide (PERMEK D (DR), PERMEK H (HR, HY), PERMEK N (NR, NY), PERMEK S (SR), PERMEK F (FR), PERMEK G (GR, GY)), cyclohexanone peroxide (PERHEXA H), acetylacetone peroxide (PERCURE AH, AL), 1,1-di(t-hexylperoxy)-3,3,5-trimethylcyclohexane (PERHEXA TMH), 1,1-di(t-hexylperoxy)cyclohexane (PERHEXA HC), 1,1-di(t-butylperoxy)-2-methylcyclohexane (PERHEXA MC), 1,1-di(t-butylperoxy)cyclohexane (PERHEXA C-80 (S), PERHEXA C-75 (EB), PERHEXA C (C), PERHEXA C-40, PERHEXA C-40MB (S)), 2,2-di(t-butylperoxy)butane (PERHEXA 22), butyl 4,4-di-(t-butylperoxy)pentanoate (PERHEXA V, PERHEXA V-40 (F)), 2,2-di(4,4-di-(t-butylperoxy)cyclohexyl)propane (PERTETRA A), p-menthane hydroperoxide (PERMENTA H), diisopropylbenzene hydroperoxide (PERCUMYL P), 1,1,3,3-tetramethylbutyl hydroperoxide (PEROCTA H), cumene hydroperoxide (PERCUMYL H-80), t-butyl hydroperoxide (PERBUTYL H-69), di(2-t-butylperoxyisopropyl)benzene (PERBUTYL P, PERBUTYL P-40, PEROXYMON F-40, PERBUTYL P-40MB(K)), di-t-hexyl peroxide (PERHEXYL D), diisobutyryl peroxide (PEROYL IB), di(3,5,5-trimethylhexanoyl) peroxide (PEROYL 355 (S)), dilauroyl peroxide (PEROYL L), disuccinic acid peroxide (PEROYL SA), di-(3-methylbenzoyl) peroxide, benzoyl (3-methylbenzoyl) peroxide, and a mixture of dibenzoyl peroxides (NYPER BMT-K40, NYPER BMT-M), dibenzoyl peroxide (NYPER BW, NYPER BO, NYPER FF, NYPER BS, NYPER E, NYPER NS), di(4-methylbenzoyl) peroxide (NYPER PMB), di-n-propyl peroxydicarbonate (PEROYL NPP-50M), diisopropyl peroxydicarbonate (PEROYL IPP-50, PEROYL IPP-27), di(4-t-butylcyclohexyl) peroxydicarbonate (PEROYL TCP), di(2-ethylhexyl) peroxydicarbonate (PEROYL OPP), di-sec-butyl peroxydicarbonate (PEROYL SBP), cumyl peroxyneodecanoate (PERCUMYL ND, PERCUMYL ND-50E), 1,1,3,3-tetramethylbutyl peroxyneodecanoate (PEROCTA ND, PEROCTA ND-50E), t-hexyl peroxyneodecanoate (PERHEXYL ND, PERHEXYL ND-50E), t-butyl peroxyneodecanoate (PERBUTYL ND, PERBUTYL ND-50E), t-butyl peroxyneoheptanoate (PERBUTYL NHP), t-hexyl peroxypivalate (PERHEXYL PV, PERHEXYL PV-50E), t-butyl peroxypivalate (PERBUTYL PV, PERBUTYL PV-40E), 1,1,3,3-tetramethylbutyl peroxy-2-ethylhexanoate (PEROCTA O), 2,5-dimethyl-2,5-di(2-ethylhexanoylperoxy)hexane (PERHEXA 250), t-hexyl peroxy-2-ethylhexanoate (PERHEXYL O, PERCURE HO(N)), t-butyl peroxy-2-ethylhexanoate (PERBUTYL O, PERCURE O), t-hexyl peroxyisopropylmonocarbonate (PERHEXYL I), t-butyl peroxy-3,5,5-trimethylhexanoate (PERBUTYL 355), t-butyl peroxylaurate (PERBUTYL L), t-butyl peroxy-2-ethylhexylmonocarbonate (PERBUTYL E), t-hexyl peroxybenzoate (PERHEXYL Z), t-butyl peroxyacetate (PERBUTYL A), a mixture of t-butyl peroxy-3-methylbenzoate and t-butyl peroxybenzoate (PERBUTYL ZT), t-butyl peroxybenzoate (PERBUTYL Z), t-butyl peroxyallylmonocarbonate (PERCHER AC), 3,3',4,4'-tetra(t-butylperoxycarbonyl)benzophenone (BTTB-25), and 2,3-dimethyl-2,3-diphenylbutane (NOFMER BC-90). Among these, preferred are of the dialkyl type. Furthermore, 2,5-dimethyl-2,5-di(t-butylperoxy)hexane is particularly preferable. In general, the type and amount of organic peroxide to be used are selected in consideration of the amount of active —O—O— and decomposition temperature.

Also, the cross-linking aid that can be used in this case is any compound that has reaction activity for peroxy radicals and polymer radicals, and examples thereof include polyfunctional compounds having a functional group such as —CH=CH$_2$, —CH$_2$CH=CH$_2$, —CF=CF$_2$, —C(CF$_3$)=CF$_2$, —C(CH$_3$)=CF$_2$, —CF=CF(CF$_3$), —CF=CF(CH$_3$), —C(C$_6$H$_5$)=CF$_2$, —CF=CF(C$_6$H$_5$), —CH=CF$_2$, —CF=CHF, —C(CF$_3$)=CHF, —CF=CH(CF$_3$), and —CH=CF(CF$_3$) ("C$_6$H$_5$" in each formula represents a phenyl group). Specific examples thereof include triallyl cyanurate, triallyl isocyanurate (TRIC), triacrylformal, triallyl trimellitate, N,N'-n-phenylenebismaleimide, dipropagyl terephthalate, diaryl phthalate, tetraallyl terephthalateamide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-(diallylacrylamide), and 1,6-divinyldodecafluorohexane.

In addition, examples of the cross-linking aid to be used together with the peroxide cross-linking agent may also include a compound represented by the general formula (31):

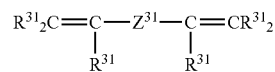

wherein six R$^{31}$ are each independently H, a halogen atom, or an optionally halogenated group having 1 to 5 carbon atoms and optionally having an ether bond intercalated therein, and Z$^{31}$ is an optionally halogenated, linear or branched alkylene group having 1 to 18 carbon atoms and optionally containing a heteroatom, a cycloalkylene group, or a (per) fluoropolyoxyalkylene group.

Examples of the compound represented by the general formula (31) may include:

a compound represented by the general formula (32):

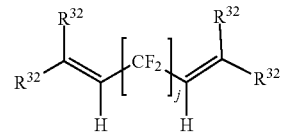

wherein j is an integer of 2 to 10, preferably an integer of 4 to 8; four R$^{32}$ are each independently H, F, or an alkyl group or (per)fluoroalkyl group having 1 to 5 carbon atoms;

a compound represented by the general formula (33):

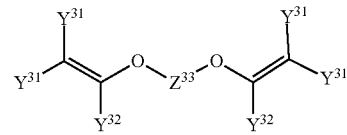

wherein Y$^{31}$ is each independently F, Cl, or H; Y$^{32}$ is each independently F, Cl, H, or OR$^{33}$ (where R$^{33}$ is an optionally partially, substantially, or fully fluorinated or chlorinated, branched or linear alkyl group); Z$^{33}$ is an optionally fluorinated divalent group having 2 to 10 carbon atoms and optionally having an ether bond intercalated therein, and Z$^{33}$ is preferably a —(CF$_2$)$_m$— group where m is an integer of 3 to 5; and the compound represented by the general formula (33) is preferably F$_2$C=CF—O—(CF$_2$)$_5$—O—CF=CF$_2$); and a compound represented by the general formula (34):

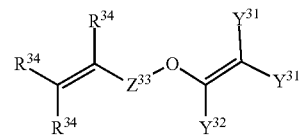

wherein Y$^{31}$, Y$^{32}$, and Z$^{33}$ are each defined as described above; and R$^{34}$ is each independently H, F, or an alkyl group or (per)fluoroalkyl group having 1 to 5 carbon atoms.

Examples of the cross-linking agent or the cross-linking aid to be used together with the peroxide cross-linking agent may also include a compound having at least one structure represented by the general formula (35):

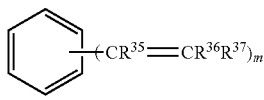

wherein $R^{35}$ to $R^{37}$ are each independently a hydrogen atom, a fluorine atom, an alkyl group, a fluorinated alkyl group, or a substituted or unsubstituted aryl group, and at least one of $R^{35}$ to $R^{37}$ is a fluorine atom or a group containing a fluorine atom; m is an integer of 1 to 5; when m is 2 or more, m $R^{35}$ to $R^{37}$ may be the same as or different from each other; and the hydrogen atoms of the benzene ring are optionally substituted. When m is 1, it is preferable that the compound has 2 or more of the above structure.

Examples of the compound represented by the general formula (35) may include:

a compound represented by the general formula (36):

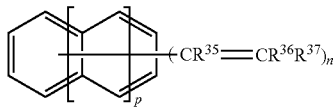

wherein $R^{35}$ to $R^{37}$ are defined as described above; p is an integer of 0 to 2; and n is an integer of 2 to 6); and a compound represented by the general formula (37):

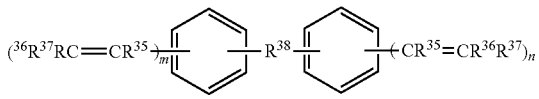

wherein $R^{35}$ to $R^{37}$ are defined as described above; $R^{38}$ is a single bond, —SO$_2$—, —O—, —S—, —CO—, a heteroatom-containing group, a substituted or unsubstituted alkylene group, a substituted or unsubstituted cycloalkylene group, or a substituted or unsubstituted arylene group; m is an integer of 1 to 5; and these groups may be partially or fully fluorinated.

The heteroatom-containing group is not limited as long as it is a divalent group containing a heteroatom. Examples of the heteroatom may include an oxygen atom, a nitrogen atom, a sulfur atom, a boron atom, and a phosphorus atom.

Examples of the cross-linking agent used in polyol cross-linking include polyhydric alcohol compounds such as bisphenol A and bisphenol AF.

Examples of the cross-linking agent used in polyamine crosslinking include polyvalent amine compounds such as hexamethylenediamine carbamate, N,N'-dicinnamylidene-1,6-hexanediamine, and 4,4'-bis(aminocyclohexyl)methane carbamate.

Examples of the cross-linking agent used in triazine crosslinking include organotin compounds such as tetraphenyltin and triphenyltin.

Examples of the cross-linking agent used in oxazole crosslinking, imidazole crosslinking, and thiazole crosslinking include:

a bisdiaminophenyl cross-linking agent, bisaminophenol cross-linking agent, or bisaminothiophenol cross-linking agent represented by the general formula (41):

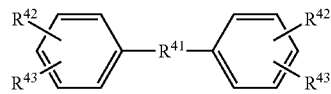

wherein $R^{41}$ is —SO$_2$—, —O—, —CO—, an alkylene group having 1 to 6 carbon atoms, a perfluoroalkylene group having 1 to 10 carbon atoms, a single bond, or a group represented by the following formula:

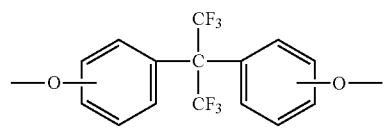

one of $R^{42}$ and $R^{43}$ is —NH$_2$ and the other is —NHR$^{44}$, —NH$_2$, —OH, or —SH, where $R^{44}$ is a hydrogen atom, a fluorine atom, or a monovalent organic group, and preferably $R^{42}$ is —NH$_2$ and $R^{43}$ is —NHR$^{44}$; specific preferred examples of the alkylene group having 1 to 6 carbon atoms may include a methylene group, an ethylene group, a propylene group, a butylene group, a pentylene group, and a hexylene group; examples of the perfluoroalkylene group having 1 to 10 carbon atoms include:

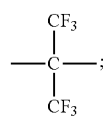

and note that these compounds are known as examples of bisdiaminophenyl compounds in Japanese Patent Publication No. 2-59177, Japanese Patent Laid-Open No. 8-120146, and the like;

a bisamidrazone cross-linking agent represented by the general formula (42):

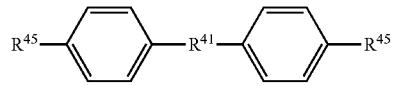

wherein $R^{41}$ is defined as described above; and $R^{45}$ is each independently any of the following formulas:

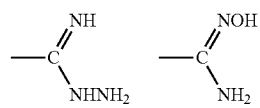

an amidrazone cross-linking agent represented by the general formula (43):

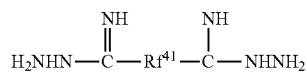

wherein Rf$^{41}$ is a perfluoroalkylene group having 1 to 10 carbon atoms;

a bisamidoxime cross-linking agent represented by the general formula (44):

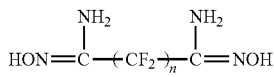

wherein n is an integer of 1 to 10; and a compound represented by the general formula (45): $HN=CR^{45}R^{46}$, wherein $R^{45}$ is selected from the group consisting of H, $NH_2$, and $NHR^{47}$; $R^{46}$ is selected from the group consisting of Ph, $SO_2H$, $NR^{48}R^{49}$, 2-pyridine, and $CH_2CONH_2$; $R^{47}$ is selected from the group consisting of Ph, $NH_2$, and CN; $R^{48}$ is selected from the group consisting of H, NHPh, $CH_2CONH_2$, a linear alkyl group having 1 to 8 carbon atoms, and a branched alkyl group having 1 to 8 carbon atoms; and $R^{49}$ is selected from the group consisting of Ph, $COOC(CH_3)_3$, $NH_2$, $CH_2COOH$, $CSNH_2$, $CNHNH_3^+Cl^-$, p-phenyl-CN,

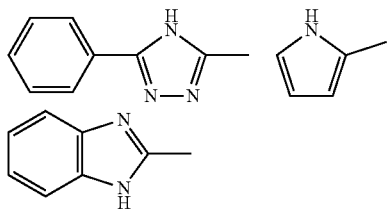

and COPh. These bisaminophenol cross-linking agent, bisaminothiophenol cross-linking agent, and bisdiaminophenyl cross-linking agent are conventionally used in cross-linking systems that use cyano groups as crosslinking points, but they also react with carboxyl groups and alkoxycarbonyl groups to form oxazole rings, thiazole rings, and imidazole rings, providing crosslinked products.

Examples of the cross-linking agent may also include a cross-linking agent represented by the general formula (46): $X^{41}-(CH_2)_n-R^{50}-(CH_2)_m-X^{41}$, wherein $X^{41}$ is each independently an alkyne group, a cyano group, or $Y^{41}{}_pN_3$ (where $Y^{41}$ is SO, $SO_2$, $C_6H_4$, or CO and p is 0 or 1); n and m are each independently an integer of 1 to 4; and $R^{50}$ is selected from the group consisting of:
  i) a fluoroalkylene group having 3 to 10 carbon atoms;
  ii) a fluoroalkoxylene group having 3 to 10 carbon atoms;
  iii) a substituted arylene group;
  iv) an oligomer comprising copolymerized units of vinylidene fluoride and perfluoro(methyl vinyl ether);
  v) an oligomer comprising copolymerized units of vinylidene fluoride and hexafluoropropylene;
  vi) an oligomer comprising copolymerized units of tetrafluoroethylene and perfluoro(methyl vinyl ether); and
  vii) an oligomer comprising copolymerized units of tetrafluoroethylene and a hydrocarbon olefin. It is preferable that this cross-linking agent is used together with a perfluoroelastomer having cyano groups, azide groups, sulfonyl azide groups, carbonyl azide groups, or alkyne groups. For example, a cyano group of the perfluoroelastomer reacts with an azide group of the cross-linking agent to form a tetrazole ring, providing a crosslinked product.

Examples of the particularly preferred cross-linking agent include a compound having multiple 3-amino-4-hydroxyphenyl groups or 3-amino-4-mercaptophenyl groups, and a compound represented by the general formula (47):

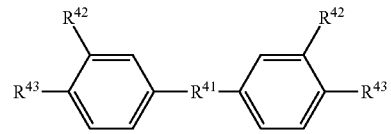

wherein $R^{41}$, $R^{42}$, and $R^{43}$ are defined as described above, and specific examples thereof include 2,2-bis(3-amino-4-hydroxyphenyl)hexafluoropropane (generic name: bis(aminophenol) AF), 2,2-bis(3-amino-4-mercaptophenyl)hexafluoropropane, tetraaminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

Among these, 2,2-bis[3-amino-4-(N-phenylamino)phenyl]hexafluoropropane is preferable as the cross-linking agent from the viewpoint of heat resistance, steam resistance, amine resistance, and good crosslinkability.

The content of the above cross-linking agent is preferably 0.05 to 10 parts by mass, and more preferably 0.5 to 5 parts by mass, based on 100 parts by mass of the perfluoroelastomer.

The crosslinkable composition may comprise a filler.

Examples of the filler include an organic filler, and from the viewpoint of heat resistance and plasma resistance (low particle generation and low weight loss during plasma irradiation), an organic pigment; an imide filler with an imide structure such as polyimide, polyamide-imide, and polyetherimide; and a ketone engineering plastic such as polyether ether ketone (PEEK) and polyether ketone (PEK) are preferable. In particular, an organic pigment is preferable.

Examples of the organic pigment include a condensed azo pigment, an isoindolinone pigment, a quinacridone pigment, a diketo-pyrrolo-pyrrole pigment, and an anthraquinone pigment, but among these, from the viewpoint of excellent heat resistance and chemical resistance and less influence on the characteristics of crosslinked products, a quinacridone pigment, a diketo-pyrrolo-pyrrole pigment, and an anthraquinone pigment are preferable, and a quinacridone pigment is more preferable.

Furthermore, a general filler may be contained as well. Examples of the general filler include an organic filler made of an engineering plastic such as polyarylate, polysulfone, polyethersulfone, polyphenylene sulfide, polyoxybenzoate, and polytetrafluoroethylene powder; a metal oxide filler such as aluminum oxide, silicon oxide, yttrium oxide, and titanium oxide; a metal carbide filler such as silicon carbide and aluminum carbide, and a metal nitride filler such as silicon nitride and aluminum nitride; and an inorganic filler such as aluminum fluoride, fluorocarbon, barium sulfate, carbon black, silica, clay, and talc.

Among these, from the viewpoint of shielding effects for various plasmas, carbon black, aluminum oxide, silicon oxide, yttrium oxide, silicon nitride, polyimide, and fluorocarbon are preferable.

In addition, the inorganic filler and the organic filler may be compounded alone or in combination of two or more types.

The content of the filler in the crosslinkable composition is preferably 0.5 to 100 parts by mass, and more preferably 5 to 50 parts by mass, based on 100 parts by mass of the perfluoroelastomer.

Particularly, in a field where high purity and antistaining properties are not demanded, usual additives to be compounded into perfluoroelastomers if required, such as processing aids, plasticizers, and coloring agents, can be compounded, and one or more types of ordinary cross-linking agents or cross-linking aids different from those described above may also be compounded.

The crosslinkable composition may comprise an organic basic compound. Examples of the organic basic compound may include:

octadecylamine of the formula: $CH_3(CH_2)_{17}-NH_2$;
erucamide of the formula: $H_2N-C(O)-(CH_2)_{11}-CH=CH-(CH_2)_7CH_3$;
oleamide of the formula: $H_2N-C(O)-(CH_2)_7-CH=CH-(CH_2)_7CH_3$;
hexamethylenediamine of the formula: $H_2N-(CH_2)_6-NH_2$; and
1,8-diazabicycloundec-7-ene (DBU) of the formula:

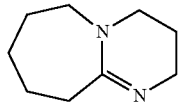

The crosslinkable composition can be prepared by mixing each of the above components using a normal processing machine for polymers, such as an open roll, a Banbury mixer, and a kneader. In addition, it can also be prepared by a method using an internal mixer.

In addition, the present disclosure also relates to a composition comprising a perfluoroelastomer and a polymer (1) containing a polymerized unit (1) derived from a monomer represented by the following general formula (1):

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —SO$_3$M, —OSO$_3$M, or —C(CF$_3$)$_2$OM, where M is —H, a metal atom, —NR$^7_4$, imidazolium optionally having a substituent, pyridinium optionally having a substituent, or phosphonium optionally having a substituent and R$^7$ is —H or an organic group, with the proviso that at least one of X, Y, and Z contains a fluorine atom.

The suitable configuration of the perfluoroelastomer is the same as the configuration of the perfluoroelastomer obtained by the production method of the present disclosure.

The suitable configuration of the polymer (1) is the same as the configuration of the polymer (1) used in the production method of the present disclosure.

The form of the composition of the present disclosure is not limited, but it may be in the form of, for example, an aqueous dispersion, gum, crumb, powder, pellets, or the like. The aqueous dispersion refers to a dispersion system in which an aqueous medium is the dispersion medium and the perfluoroelastomer is the dispersoid. The above aqueous medium is not limited as long as it is a liquid containing water, and it may be one containing, in addition to water, an organic solvent such as an alcohol, an ether, a ketone, and a paraffin wax.

The lower limit value of the content of the polymer (1) in the above composition is preferably 0.0001% by mass, more preferably 0.001% by mass, still more preferably 0.01% by mass, and particularly preferably 0.1% by mass, based on the perfluoroelastomer. The upper limit value of the content of the polymer (1) in the above composition is preferably 20% by mass, more preferably 10% by mass, still more preferably 6% by mass, further preferably 4% by mass, and most preferably 2% by mass or less.

The content of the polymer (1) in the above composition can be determined by, for example, solid-state $^{19}$F-MAS NMR measurement. Examples of the method for measuring the content of the polymer (I) include methods for measuring the content of the respective polymers disclosed in International Publication No. WO 2014/099453, International Publication No. WO 2010/075497, International Publication No. WO 2010/075496, International Publication No. WO 2011/008381, International Publication No. WO 2009/055521, International Publication No. WO 1987/007619, Japanese Patent Laid-Open No. 61-293476, International Publication No. WO 2010/075494, International Publication No. WO 2010/075359, International Publication No. WO 2012/082454, International Publication No. WO 2006/119224, International Publication No. WO 2013/085864, International Publication No. WO 2012/082707, International Publication No. WO 2012/082703, International Publication No. WO 2012/082454, International Publication No. WO 2012/082451, International Publication No. WO 2006/135825, International Publication No. WO 2004/067588, International Publication No. WO 2009/068528, Japanese Patent Laid-Open No. 2004-075978, Japanese Patent Laid-Open No. 2001-226436, International Publication No. WO 1992/017635, International Publication No. WO 2014/069165, Japanese Patent Laid-Open No. 11-181009, and the like. Specific examples of the device used therefor include AVANCE III HD400 manufactured by Bruker and AVANCE300 manufactured by Bruker. The rotation speed is set according to the resonance frequency of the device, and is set such that the spinning side band does not overlap the peaks used for the content calculation of the perfluoroelastomer or the polymer (1).

Also, the content of the polymer (1) in the above composition may be measured by the following method. It can be measured by a method in which the above composition is mixed with a solvent that dissolves the perfluoroelastomer, deionized water is added to the obtained mixed solution to extract the polymer (1) from the obtained mixed solution, the upper phase (aqueous phase) containing the polymer (1) is collected, and the mass of the residue (polymer (1)) obtained by heating and drying the collected upper phase is measured to calculate the content of the polymer (1).

As the solvent that dissolves the perfluoroelastomer, a perhalo solvent in which all of the hydrogen atoms are replaced by halogen atoms is preferable, and in particular, a perfluoro solvent in which all of the hydrogen atoms are replaced by fluorine atoms is preferable. Specific examples of the perfluoro solvent include perfluoro tertiary amines such as perfluorotri-n-butylamine and perfluorotriethylamine, perfluorinated tetrahydrofuran, perfluorobenzene, Fluorinert FC-77 (manufactured by 3M Company), Demnum Solvent (manufactured by Daikin Industries, Ltd., main component: C$_6$F$_{14}$), R-318 (manufactured by Daikin Industries, Ltd., main component: $C_4F_8Cl_2$), and Fluorinert FC-43 (manufactured by 3M Company, main component: $(C_4F_9)_3N$), but among these, perfluorotri-n-butylamine and Fluorinert FC-77 are preferable from the viewpoint of handling properties.

Also, as the solvent that dissolves the perfluoroelastomer, various fluorinated solvents are preferably used in addition to those exemplified above, and specific examples thereof include perfluoroalkanes, HFCs (hydrofluorocarbons), HFEs (hydrofluoroethers), and HCFCs (hydrochlorofluorocarbons). Specifically, mention may be made of HFE-7100 (manufactured by 3M Company, main component: $C_4F_9OCH_3$), HFE-7200 (manufactured by 3M Company, main component: $C_4F_9OC_2H_5$), and Vertrel XF (manufactured by The Chemours Company, main component: $C_5H_2F_{10}$).

The content of the dimer and trimer of the monomer represented by the general formula (1) in the composition is preferably 1.0% by mass or less, more preferably 0.1% by mass or less, still more preferably 0.01% by mass or less, particularly preferably 0.001% by mass or less, and most preferably 0.0001% by mass or less, based on the polymer (1).

The content of the dimer and trimer of the monomer represented by the general formula (1) in the composition can be measured by a method that is the same as that for the content of the dimer and trimer in the polymer (1).

The composition of the present disclosure may be an aqueous dispersion containing the perfluoroelastomer, the polymer (1), and the aqueous medium. The upper limit value of the solid concentration of the aqueous dispersion is preferably 50% by mass, more preferably 40% by mass, still more preferably 35% by mass, and particularly preferably 30% by mass, based on the aqueous dispersion. The lower limit value of the solid concentration of the aqueous dispersion is preferably 5% by mass, more preferably 10% by mass, still more preferably 15% by mass, and particularly preferably 20% by mass.

The solid concentration of the aqueous dispersion refers to the concentration of solids contained in the aqueous dispersion. Examples of the solids include the perfluoroelastomer and the polymer (1). Also, the solid concentration of the aqueous dispersion may be the total content of the perfluoroelastomer and the polymer (1) in the aqueous dispersion. The solid concentration of the aqueous dispersion can be specified by drying 1 g of the aqueous dispersion at 150° C. for 60 minutes, measuring the mass of the non-volatile matter, and calculating the proportion of the mass of the non-volatile matter to the mass of the aqueous dispersion.

In one embodiment, the composition of the present disclosure contains a fluorine-containing surfactant. Also, in another embodiment, the composition of the present disclosure is substantially free from a fluorine-containing surfactant.

In the present disclosure, the expression "substantially free from a fluorine-containing surfactant" means that the content of the fluorine-containing surfactant is 10 ppm by mass or less based on the perfluoroelastomer. The content of the fluorine-containing surfactant is preferably 1 ppm by mass or less, more preferably 100 ppb by mass or less, still more preferably 10 ppb by mass or less, further preferably 1 ppb by mass or less, and particularly preferably the content of the fluorine-containing surfactant is below the detection limit as measured by liquid chromatography-mass spectrometry (LC/MS/MS).

The content of the fluorine-containing surfactant can be quantified by a known method, and can be quantified by, for example, LC/MS/MS analysis.

At first, to the obtained aqueous dispersion, powder, pellets, molded body, crosslinked product, or pulverized product obtained by micronizing the pellets, molded body, or crosslinked product, an organic solvent such as methanol is added to extract the fluorine-containing surfactant, and the extracted liquid is subjected to the LC/MS/MS analysis. The molecular weight information is extracted from the resulting LC/MS/MS spectrum to confirm agreement with the structural formula of the candidate surfactant. The extraction method may be the Soxhlet extraction method.

Thereafter, aqueous solutions having five or more different concentration levels of the confined surfactant are prepared, and the LC/MS/MS analysis is carried out for each concentration level to prepare a calibration curve with the area.

That is, the content of the fluorine-containing surfactant can be measured by, for example, adding methanol to the composition to carry out extraction and subjecting the resulting extracted liquid to the LC/MS/MS analysis.

In order to further increase the extraction efficiency, a treatment by Soxhlet extraction, ultrasonic treatment, or the like may be performed.

The molecular weight information is extracted from the obtained LC/MS/MS spectrum to confirm agreement with the structural formula of the candidate fluorine-containing surfactant.

Thereafter, aqueous solutions having five or more different content levels of the confirmed fluorine-containing surfactant are prepared, and the LC/MS/MS analysis is carried out on the aqueous solutions with the respective content levels, and the relationship between the content level and the area corresponding to that content level is plotted to draw a calibration curve.

Then, using the calibration curve, the area of the LC/MS/MS chromatogram of the fluorine-containing surfactant in the extracted liquid can be converted to the content of the fluorine-containing surfactant.

The fluorine-containing surfactant is the same as those exemplified in the production method of the present disclosure mentioned above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the above anionic fluorine-containing surfactant include a compound represented by the general formula ($N^0$), and specific examples thereof include a compound represented by the general formula ($N^1$), a compound represented by the general formula ($N^2$), a compound represented by the general formula ($N^3$), a compound represented by the general formula ($N^4$), and a compound represented by the general formula ($N^5$). More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylenesulfonic acid (VIII) represented by the general formula (VIII), an alkylalkylenecarboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

Suitably, the composition of the present disclosure can be produced by the production method of the present disclosure.

The present disclosure also relates to a crosslinkable composition comprising the above composition and a cross-linking agent. The suitable configuration of the cross-linking agent is the same as the configuration of the crosslinkable composition obtained by the production method of the present disclosure. The crosslinkable composition may comprise the filler mentioned above and usual additives to be compounded into perfluoroelastomers if required, such as processing aids, plasticizers, and coloring agents.

By crosslinking the crosslinkable composition mentioned above, a crosslinked product can be obtained.

The above crosslinking can be carried out in the order of primary crosslinking and secondary crosslinking. The primary crosslinking is preferably carried out at 150 to 200° C. for 5 to 120 minutes, and it is more preferably carried out at 170 to 190° C. for 5 to 60 minutes. As the crosslinking means, a known crosslinking means may be used, and examples thereof may include press crosslinking.

The secondary crosslinking is preferably carried out at 250 to 320° C. for 2 to 24 hours, and it is more preferably carried out at 280 to 310° C. for 5 to 20 hours. As the crosslinking means, a known crosslinking means may be used, and examples thereof may include oven crosslinking.

By molding the crosslinkable composition to obtain a preform and then crosslinking it, the crosslinked product (molded article) may be obtained. The method for molding the crosslinkable composition to obtain the preform may be a usual method, and it can be carried out by a known method such as a method in which the crosslinkable composition is heated and compressed in a metal mold, a method in which the crosslinkable composition is pressed into a heated metal mold, and a method in which the crosslinkable composition is extruded by an extruder. In the case of extruded products such as hoses and electric wires, the crosslinked product can be obtained by carrying out heating crosslinking with steam or the like after extrusion.

The crosslinked product of the present disclosure can be suitably used as a seal material for semiconductor manufacturing apparatuses that particularly require heat resistance, and especially for semiconductor manufacturing apparatuses where high density plasma irradiation is carried out. Examples of the above seal material include an O-ring, a square ring, a gasket, a packing, an oil seal, a bearing seal, and a lip seal.

In addition, it can also be used for various polymer products used in semiconductor manufacturing apparatuses, such as a diaphragm, a tube, a hose, various rubber rolls, and a belt. It can also be used as a coating material and lining material.

Note that the semiconductor manufacturing apparatuses as used herein are not limited to those for manufacturing semiconductors in particular, but encompass a wide range of manufacturing apparatuses used in the semiconductor field that require a high level of cleanliness, such as those for manufacturing liquid crystal panels and plasma panels. Examples thereof may include the following.

(1) Etching Apparatuses
   Dry etching apparatuses
   Plasma etching apparatuses
   Reactive ion etching apparatuses
   Reactive ion beam etching apparatuses
   Sputter etching apparatuses
   Ion beam etching apparatuses
   Wet etching apparatuses
   Ashing apparatuses (2) Cleaning Apparatuses
   Dry etching cleaning apparatuses
   UV/$O_3$ cleaning apparatuses
   Ion beam cleaning apparatuses
   Laser beam cleaning apparatuses
   Plasma cleaning apparatuses
   Gas etching cleaning apparatuses
   Extraction cleaning apparatuses
   Soxhlet extraction cleaning apparatuses
   High temperature high pressure extraction cleaning apparatuses
   Microwave extraction cleaning apparatuses
   Supercritical extraction cleaning apparatuses (3) Exposure Apparatuses
   Steppers
   Coater/developers (4) Polishing Apparatuses
   CMP apparatuses (5) Film Forming Apparatuses
   CVD apparatuses
   Sputtering apparatuses (6) Diffusion/Ion Implantation Apparatuses
   Oxidation diffusion apparatuses
   Ion implantation apparatuses The crosslinked product of the present disclosure exhibits excellent performance as, for example, a seal material for CVD apparatuses, plasma etching apparatuses, reactive ion etching apparatuses, ashing apparatuses, or excimer laser exposure machines.

In addition, the crosslinked product of the present disclosure has excellent heat resistance, oil resistance, amine resistance, chemical resistance, and low-temperature resistance, and is generally used for locations that slide in contact with other materials, encapsulate or seal other materials or substances, or are intended for vibration proofing or sound proofing. It can be used as various components in a variety of fields such as the automobile industry, aircraft industry, and semiconductor industry.

Examples of the fields in which the crosslinked product of the present disclosure is used include: the semiconductor-related field; the automobile field; the aircraft field; the space and rocket field; the shipping field; the chemical product field, such as chemical plants; the pharmaceutical field, such as pharmaceuticals; the photographic field, such as developers; the printing field, such as printing machines; the painting field, such as painting facilities; the analytical and physical and chemical machinery fields, such as analytical equipment and measuring equipment; the food equipment field, including food plant equipment and household products; the beverage and food production apparatus field; the pharmaceutical production apparatus field; the medical component field; the chemical agent transportation equipment field; the nuclear power plant equipment field; the iron and steel field, such as iron plate processing facilities; the general industrial field; the electrical field; the fuel cell field; the electronic component field; the optical equipment component field; the space equipment component field; the petrochemical plant equipment field; the field of equipment components for exploring and mining energy resources such as petroleum and gas; the petroleum refinement field; and the petroleum transportation equipment component field.

Examples of the forms of use of the crosslinked product of the present disclosure include various seal materials and packings, such as a ring, a packing, a gasket, a diaphragm, an oil seal, a bearing seal, a lip seal, a plunger seal, a door seal, a lip and face seal, a gas delivery plate seal, a wafer support seal, and a barrel seal. It can be used as a seal material for applications that require heat resistance, solvent resistance, chemical resistance, and non-stickiness.

It can also be used as a tube, a hose, a roll, various rubber rolls, a flexible joint, a rubber plate, a coating, a belt, a damper, a valve, a valve seat, a valve element of valves, a chemical resistant coating material, a lamination material, and a lining material.

Note that the cross-sectional shape of the above ring, packing, and seal may be of a variety of shapes. Specifically, it may be in the shape of a square, O shape, ferrule, or the like, or in an irregular shape such as a D shape, L shape, T shape, V shape, X shape, or Y shape.

In the above semiconductor-related field, the crosslinked product of the present disclosure can be used for, for example, semiconductor manufacturing apparatuses, liquid crystal panel manufacturing apparatuses, plasma panel manufacturing apparatuses, plasma display panel manufacturing apparatuses, plasma address liquid crystal panel manufacturing apparatuses, organic EL panel manufacturing apparatuses, field emission display panel manufacturing apparatuses, solar cell substrate manufacturing apparatuses, semiconductor transport apparatuses, and the like. Examples of such apparatuses include: CVD apparatuses; gas control apparatuses, such as gas control apparatuses for semiconductors; dry etching apparatuses; wet etching apparatuses; plasma etching apparatuses; reactive ion etching apparatuses; reactive ion beam etching apparatuses; sputter etching apparatuses; ion beam etching apparatuses; oxidation diffusion apparatuses; sputtering apparatuses; ashing apparatuses; plasma ashing apparatuses; cleaning apparatuses; ion implantation apparatuses; plasma CVD apparatuses; ventilation apparatuses; exposure apparatuses; polishing apparatuses; film forming apparatuses; dry etching cleaning apparatuses; UV/$O_3$ cleaning apparatuses; ion beam cleaning apparatuses; laser beam cleaning apparatuses; plasma cleaning apparatuses; gas etching cleaning apparatuses; extraction cleaning apparatuses; Soxhlet extraction cleaning apparatuses; high temperature high pressure extraction cleaning apparatuses; microwave extraction cleaning apparatuses; supercritical extraction cleaning apparatuses; cleaning apparatuses using hydrofluoric acid, hydrochloric acid, sulfuric acid, ozone water, and the like; steppers; coater/developers; CMP apparatuses; excimer laser exposure machines; chemical solution piping; gas piping; apparatuses on which plasma treatment such as $NF_3$ plasma treatment, $O_2$ plasma treatment, and fluorine plasma treatment is carried out; heat treatment film forming apparatuses; wafer transport equipment; wafer cleaning apparatuses; silicon wafer cleaning apparatuses; silicon wafer treatment apparatuses; apparatuses used for the LP-CVD step; apparatuses used for the lamp annealing step; and apparatuses used for the reflow step.

Examples of the specific forms of use in the semiconductor-related field include various seal materials, such as O-rings and gaskets for gate valves, quartz windows, chambers, chamber lids, gates, bell jars, couplings, and pumps; various seal materials such as O-rings, hoses, and tubes for resist developing solutions and stripping solutions; linings and coatings for resist developing solution baths, stripping solution baths, wafer cleaning solution baths, and wet etching baths; diaphragms for pumps; rolls for wafer transport; hose tubes for wafer cleaning solutions; seal materials for clean facilities, such as sealants for clean facilities including clean rooms; sealing materials for semiconductor manufacturing apparatuses and vaults for storing devices such as wafers; diaphragms for transferring chemical solutions used in the semiconductor manufacturing step.

In the above automobile field, the crosslinked product of the present disclosure can be used for the engine body, the main drive system, the valve train system, the lubrication and cooling system, the fuel system, the air intake and exhaust system, the transmission system of the drive system, the steering system of the chassis, and the brake system, as well as electrical components such as basic electrical components, control system electrical components, and equipment electrical components. Note that the above automobile field encompasses motorcycles as well.

In the engine body and its peripheral apparatuses as mentioned above, the crosslinked product of the present disclosure can be used for various seal materials that require heat resistance, oil resistance, fuel oil resistance, resistance against antifreezing liquid for engine cooling, and steam resistance, and examples of such seal materials include seals such as gaskets, shaft seals, and valve stem seals, non-contact or contact type packings such as self seal packings, piston rings, split ring type packings, mechanical seals, and oil seals, bellows, diaphragms, hoses, and tubes, as well as various seal materials used for electric wires, cushioning materials, vibration proofing materials, and belt AT apparatuses.

Examples of the specific forms of use in the above fuel system include O-rings used for fuel injectors, cold start injectors, quick connectors of fuel lines, sender flange quick connectors, fuel pumps, fuel tank quick connectors, gasoline mixing pumps, gasoline pumps, tube bodies of fuel tubes, connectors of fuel tubes, injectors, and the like; seals used for intake manifolds, fuel filters, pressure regulating valves, canisters, caps of fuel tanks, fuel pumps, fuel tanks, sender units of fuel tanks, fuel injection apparatuses, fuel high pressure pumps, fuel line connector systems, pump timing control valves, suction control valves, solenoid subassemblies, fuel cut valves, and the like; canister purge solenoid valve seals, onboard refueling vapor recovery (ORVR) valve seals, oil seals for fuel pumps, fuel sender seals, fuel tank rollover valve seals, filler seals, injector seals, filler cap seals, and seals of filler cap valves; hoses such as fuel hoses, fuel supply hoses, fuel return hoses, vapor (evaporative) hoses, vent (breather) hoses, filler hoses, filler neck hoses, hoses in fuel tanks (in-tank hoses), control hoses of carburetors, fuel inlet hoses, and fuel breather hoses; gaskets used for fuel filters, fuel line connector systems, and the like, and flange gaskets used for carburetors and the like; line materials such as vapor recovery lines, fuel feed lines, and vapor/ORVR lines; diaphragms used for canisters, ORVR, fuel pumps, fuel tank pressure sensors, gasoline pumps, sensors of carburetors, combined air controlling (CAC) apparatuses, pulsation dampers, canisters, auto cocks, and the like, and pressure regulator diaphragms of fuel injection apparatuses; valves for fuel pumps, carburetor needle valves, rollover check valves, and check valves; tubes used in vents (breathers) and fuel tanks; tank packings of fuel tanks and the like, and packings of acceleration pump pistons of carburetors; fuel sender vibration proofing components for fuel tanks; O-rings and diaphragms for controlling fuel pressure; accelerator pump cups; in-tank fuel pump mounts; injector cushion rings of fuel injection apparatuses; injector seal rings; needle valve core valves of carburetors; accelerator pump pistons of carburetors; valve sheets of combined air controlling (CAC) apparatuses; fuel tank bodies; and seal components for solenoid valves.

Examples of the specific forms of use in the above brake system include diaphragms used for mastervacs, hydraulic brake hose air brakes, brake chambers of air brakes, and the like; hoses used for brake hoses, brake oil hoses, vacuum brake hoses, and the like; various seal materials such as oil seals, O-rings, packings, and brake piston seals; atmospheric valves and vacuum valves for mastervacs, and check valves for brake valves; piston cups (rubber cups) for master cylinders and brake cups; and O-rings and grommets for master cylinders and vacuum boosters of hydraulic brakes, boots for wheel cylinders of hydraulic brakes, and anti-lock brake systems (ABSs).

Examples of the specific forms of use in the above basic electrical components include insulators and sheaths of electric wires (harnesses), tubes of harness exterior components, and grommets for connectors.

Examples of the specific forms of use in the control system electrical components include covering materials for various sensor wires.

Examples of the specific forms of use in the above equipment electrical components include O-rings and packings of car air conditioners, cooler hoses, high pressure air conditioner hoses, air conditioner hoses, gaskets for electronic throttle units, plug boots for direct ignition, and diaphragms for distributors. The crosslinked product of the present disclosure can also be used for bonding electrical components.

Examples of the specific forms of use in the above air intake and exhaust system include: packings used for intake manifolds, exhaust manifolds, and the like, and throttle body packings of throttles; diaphragms used for EGR (exhaust gas recirculation), pressing control (BPT), wastegates, turbo wastegates, actuators, actuators of variable turbine geometry (VTG) turbos, exhaust gas purification valves, and the like; hoses, such as control hoses of EGR (exhaust gas recirculation), emission control hoses, turbo oil hoses (supply) of turbochargers, turbo oil hoses (return), turbo air hoses, intercooler hoses, turbocharger hoses, hoses connected to the compressors of turbo engines equipped with intercoolers, exhaust gas hoses, air intake hoses, turbo hoses, and DPF (diesel particulate filter) sensor hoses; air ducts and turbo air ducts; intake manifold gaskets; and seal materials of EGR, valve seats of AB valves for preventing afterburn, turbine shaft seals (of turbochargers and the like), and seal members used for rocker covers used in automobile engines and groove components of air intake manifolds and the like.

Besides, in exhaust gas control components, the crosslinked product of the present disclosure can be used as any of seals used for vapor recovery canisters, catalytic converters, exhaust gas sensors, oxygen sensors, and the like, and seals of solenoid armatures of vapor recovery and vapor canisters; intake manifold gaskets; and the like.

Also, in diesel engine-related components, it can be used as any of O-ring seals for direct injectors, rotary pump seals, control diaphragms, fuel hoses, EGR, priming pumps, diaphragms of boost compensators, and the like. In addition, it can also be used for O-rings, seal materials, hoses, tubes, and diaphragms used for urea SCR systems, urea water tank bodies of urea SCR systems, seal materials of urea water tanks, and the like.

Examples of the specific forms of use in the above transmission system include transmission-related bearing seals, oil seals, O-rings, packings, and torque converter hoses.

Examples thereof also include mission oil seals, mission oil hoses, ATF hoses, O-rings, and packings of AT.

Note that transmissions include AT (automatic transmission), MT (manual transmission), CVT (continuously variable transmission), DCT (dual clutch transmission), and the like.

Examples thereof also include oil seals, gaskets, O-rings, and packings for manual or automatic transmissions, and oil seals, gaskets, O-rings, and packings for continuously variable transmissions (belt type or toroidal type), as well as packings for ATF linear solenoids, oil hoses for manual transmissions, ATF hoses for automatic transmissions, and CVTF hoses for continuously variable transmissions (belt type or toroidal type).

Examples of the specific forms of use in the steering system include power steering oil hoses and high pressure power steering hoses.

Examples of the foams used in engine bodies of automobile engines include gaskets such as cylinder head gaskets, cylinder head cover gaskets, oil pan packings, and general gaskets, seals such as O-rings, packings, and timing belt cover gaskets, hoses such as control hoses, vibration proofing rubbers of engine mounts, control valve diaphragms, and camshaft oil seals.

In the main drive system of automobile engines, the crosslinked product of the present disclosure can be used for shaft seals such as crankshaft seals and camshaft seals, and the like.

In the valve train system of automobile engines, it can be used for valve stem oil seals of engine valves, valve sheets of butterfly valves, and the like.

In the lubrication and cooling system of automobile engines, it can be used for engine oil cooler hoses of engine oil coolers, oil return hoses, seal gaskets, water hoses around radiators, seals of radiators, gaskets of radiators, O-rings of radiators, and vacuum pump oil hoses of vacuum pumps, as well as radiator hoses, radiator tanks, diaphragms for oil pressure, fan coupling seals, and the like.

As described above, specific examples of use in the automobile field include engine head gaskets, oil pan gaskets, manifold packings, seals for oxygen sensors, oxygen sensor bushes, seals for nitrogen oxide (NOx) sensors, nitrogen oxide (NOx) sensor bushes, seals for sulfur oxide sensors, seals for temperature sensors, temperature sensor bushes, seals for diesel particulate filter sensors, diesel particulate filter sensor bushes, injector O-rings, injector packings, O-rings and diaphragms of fuel pumps, gearbox seals, power piston packings, seals of cylinder liners, seals of valve stems, static valve stem seals, dynamic valve stem seals, front pump seals of automatic transmissions, rear axle pinion seals, gaskets of universal joints, pinion seals of speedometers, piston cups of foot brakes, O-rings and oil seals of torque transmission apparatuses, seals and bearing seals of exhaust gas re-combustion apparatuses, hoses for re-combustion apparatuses, diaphragms for sensors of carburetors, vibration proofing rubbers (engine mounts, exhaust units, muffler hangers, suspension bushes, center bearings, strut bumper rubbers, and the like), vibration proofing rubbers for suspensions (strut mounts, bushes, and the like), drive system vibration proofing rubbers (dampers and the like), fuel hoses, tubes and hoses of EGR, twin carburetor tubes, core valves of needle valves of carburetors, flange gaskets of carburetors, oil hoses, oil cooler hoses, ATF hoses, cylinder head gaskets, water pump seals, gearbox seals, needle valve tips, reeds of reed valves for motorcycles, oil seals of automobile engines, seals of gasoline hose guns, seals for car air conditioners, rubber hoses for intercoolers of engines, seals of fuel line connector systems, CAC valves, needle tips, electric wires around engines, filler hoses, car air conditioner O-rings, intake gaskets, fuel tank materials, diaphragms for distributors, water hoses, clutch hoses, PS hoses, AT hoses, mastervac hoses, heater hoses, air conditioner hoses, ventilation hoses, oil filler caps, PS rack seals, rack and pinion boots, CVJ boots, ball joint dust covers, strut dust covers, weather strips, glass runs, center unit packings, body side welts, bumper rubbers, door latches, dash insulators, high tension cords, flat belts, poly V-belts, timing belts, toothed belts, V-ribbed belts, tires, wiper blades, diaphragms and plungers for regulators of LPG vehicles, diaphragms and valves for regulators of CNG vehicles, DME resistant rubber components, diaphragms and boots of auto tensioners, diaphragms and valves for idle speed control, actuators for automatic speed control, diaphragms, check valves, and plungers of negative pressure pumps, diaphragms and O-rings of O.P.S., gasoline pressure relief valves, O-rings and gaskets of engine cylinder sleeves, O-rings and gaskets of wet cylinder sleeves, seals and gaskets of differential gears (seals and gaskets for gear oils), seals and gaskets of power steering apparatuses (seals and gaskets for PSFs), seals and gaskets of shock absorbers (seals and gaskets for SAFs), seals and gaskets of constant velocity joints, seals and gaskets of wheel bearings, coating agents for metal gaskets, caliper seals, boots, wheel bearing seals, and bladders used for vulcanization molding of tires.

In the above aircraft field, space and rocket field, and shipping field, the crosslinked product of the present disclosure can be used particularly for fuel systems and lubricating oil systems.

In the above aircraft field, it can be used as, for example, any of various seal components for aircrafts, various components for aircrafts in the application of engine oil for aircrafts, jet engine valve stem seals, gaskets, and O-rings, rotating shaft seals, gaskets of hydraulic equipment, firewall seals, hoses, gaskets, and O-rings for fuel supply, cables, oil seals, and shaft seals for aircrafts, and the like.

In the above space and rocket field, the crosslinked product of the present disclosure can be used as, for example, any of lip seals, diaphragms, and O-rings of spacecrafts, jet engines, missiles, and the like, as well as O-rings that are resistant against oils for gas turbine engines, and vibration proofing stage pads for ground level control of missiles.

Also, in the shipping field, it can be used as, for example, any of propeller shaft stern seals of screws, valve stem seals for intake and exhaustion of diesel engines, valve seals of butterfly valves, valve sheets and shaft seals of butterfly valves, shaft seals of butterfly valves, stern tube seals, fuel hoses, gaskets, O-rings for engines, cables for shipping, oil seals for shipping, shaft seals for shipping, and the like.

In the above chemical product field such as chemical plants and pharmaceutical field such as pharmaceuticals, the crosslinked product of the present disclosure can be used in steps that require chemical resistance at a high level, such as steps of producing chemical products including pharmaceuticals, agrochemicals, coating materials, resins, and the like.

Examples of the specific forms of use in the above chemical product field and pharmaceutical field include seals used for chemical apparatuses, pumps for chemical agents, flowmeters, piping for chemical agents, heat exchangers, agrochemical sprayers, agrochemical transferring pumps, gas piping, fuel cells, analytical equipment and physical and chemical equipment (for example, column fittings and the like of analytical equipment and measuring equipment), contraction joints of flue gas desulfurization apparatuses, nitric acid plants, power plant turbines, and the like, seals used for medical sterilization processes, seals for plating solutions, belt roll seals for papermaking, and joint seals of wind tunnels; O-rings used for chemical apparatuses such as reactors and stirrers, analytical equipment and measuring equipment, chemical pumps, pump housings, valves, and tachometers, O-rings for mechanical seals, and O-rings for compressor sealing; packings used for high temperature vacuum dryers and tube joints and the like of gas chromatographs and pH meters, and glass cooler packings of sulfuric acid production apparatuses; diaphragms used for diaphragm pumps, analytical equipment, physical and chemical equipment, and the like; gaskets used for analytical equipment and measuring equipment; ferrules used for analytical equipment and measuring equipment; valve sheets; U-cups; linings used for chemical apparatuses, gasoline tanks, wind tunnels, and the like, and corrosion resistant linings of alumite processing tanks; coatings of masking jigs for plating; valve components of analytical equipment and physical and chemical equipment; expansion joints of flue gas desulfurization plants; hoses that are resistant against acids such as concentrated sulfuric acid, chlorine gas transferring hoses, oil resistant hoses, and rainwater drainage hoses of benzene or toluene storage tanks; chemical resistant tubes used for analytical equipment and physical and chemical equipment, and medical tubes; trichloroethylene resistant rolls for fiber dyeing and rolls for dyeing; stoppers for pharmaceuticals; medical rubber stoppers; chemical solution bottles, chemical solution tanks, bags, and chemical containers; and strong acid resistant and solvent resistant protective items such as gloves and boots.

In the above photographic field such as developers, printing field such as printing machines, and painting field such as painting facilities, the crosslinked product of the present disclosure can be used as any of rolls, belts, seals, valve components, and the like of dry copiers.

Examples of the specific forms of use in the above photographic field, printing field, and painting field include surface layers of transfer rollers of copiers, cleaning blades of copiers, and belts of copiers; rolls (including fixing rolls, adhesion rolls, and pressure rolls, for example) and belts for OA equipment such as copiers, printers, and facsimiles; rolls, roll blades, and belts of plane paper copying (PPC) machines; rolls of film processors and X-ray film processors; printing rolls, scrapers, tubes, valve components, and belts of printing machines; ink tubes, rolls, and belts of printers; painting rolls, scrapers, tubes, and valve components of coating and painting facilities; processing rolls, gravure rolls, guide rolls, guide rolls of coating lines for magnetic tape production, gravure rolls of coating lines for magnetic tape production, and coating rolls.

In the above food equipment field, including food plant equipment and household products, the crosslinked product of the present disclosure can be used in steps of food production, for food transferring equipment, and for food storage equipment.

Examples of the specific forms of use in the above food equipment field include seals of plate type heat exchangers, solenoid valve seals of vending machines, packings of thermo pots, sanitary pipe packings, packings of pressure cookers, seals of boilers, gaskets for heat exchangers, diaphragms and packings for food processing treatment apparatuses, rubber materials (for example, various seals such as heat exchanger gaskets, diaphragms, and O-rings, piping, hoses, sanitary packings, valve packings, and packings for filling used as joints between the mouth of a bottle or the like and a filler) for food processing treatment machines. Examples thereof also include packings, gaskets, tubes, diaphragms, hoses, and joint sleeves, used for products such as alcohols and soft drinks, filling apparatuses, food sterilizing apparatuses, brewing apparatuses, boilers, various food vending machines, and the like.

In the above nuclear power plant equipment field, the crosslinked product of the present disclosure can be used for check valves and pressure reducing valves around nuclear reactors, seals of apparatuses for concentrating uranium hexafluoride, and the like.

Examples of the specific forms of use in the above general industrial field include: seal materials for hydraulic equipment such as machine tools, construction machines, and hydraulic machines; seals and bearing seals of hydraulic and lubricating machines; seal materials used for mandrels and the like; seals used for windows and the like of dry cleaning equipment; seals and (vacuum) valve seals of cyclotrons, seals of proton accelerators, seals of automatic wrapping machines, diaphragms of pumps for analytical apparatuses for sulfurous acid gas or chlorine gas in the air (pollution measurement equipment), snake pump linings, rolls and belts of printers, belts (conveyor belts) for transportation, squeeze rolls for pickling of iron plates, cables of robots, solvent squeeze rolls of aluminum rolling lines and the like, O-rings of couplers, acid resistant cushioning materials, dust seals and lip rubbers of sliding portions of cutting machines, gaskets of garbage incinerators, friction materials, metal or rubber surface modifiers, and covering materials. The crosslinked product of the present disclosure can also be used as any of gaskets and seal materials of apparatuses used in papermaking processes, sealing agents of filter units for cleanrooms, sealing agents for construction, protective coating agents for concrete, cement, and the like, glass cloth impregnating materials, processing aids for polyolefins, moldability improving additives for polyethylene, fuel containers of small generators, lawn mowers, and the like, precoated metals obtained by performing primer treatment on metal plates, and the like. Besides, it can also be used as any of sheets and belts by impregnating woven fabrics and baking them.

Examples of the specific forms of use in the above iron and steel field include iron plate processing rolls of iron plate processing facilities.

Examples of the specific forms of use in the above electrical field include insulating oil caps of Shinkansen, venting seals of liquid immersed transformers, seals of transformers, jackets of oil well cables, seals of ovens such as electric furnaces, window frame seals of microwave ovens, seal materials used in bonding wedges and necks of CRTs, seal materials of halogen lamps, fixing agents for electrical components, seal materials for treating terminals of sheathed heaters, and seal materials used in insulating and moisture proofing treatment on lead wire terminals of electrical equipment. The crosslinked product of the present disclosure can also be used for covering materials for oil resistant and heat resistant electric wires, highly heat resistant electric wires, chemical resistant electric wires, highly insulating electric wires, high voltage power lines, cables, electric wires used for geothermal power generation apparatuses, electric wires used around automobile engines, and the like. It can also be used as any of oil seals and shaft seals of cables for vehicles. Furthermore, it can also be used as any of electrically insulating materials (for example, insulating spacers of various types of electrical equipment, insulating tapes used at joints, ends, and the like of cables, and materials used for heat shrinkable tubes and the like) and materials for electrical and electronic equipment used in high temperature atmosphere (for example, lead wire materials for motors and electric wire materials around high temperature furnaces). In addition, it can also be used as any of sealing layers and protective films (back sheets) of solar cells.

In the above fuel cell field, the crosslinked product of the present disclosure can be used as any of seal materials between electrodes or between an electrode and a separator in polymer electrolyte fuel cells, phosphoric acid salt fuel cells, and the like, and seals, packings, separators, and the like of piping for hydrogen, oxygen, generated water and the like.

In the above electronic component field, the crosslinked product of the present disclosure can be used for raw materials of heat radiating materials, raw materials of electromagnetic wave shielding materials, gaskets for hard disk drives (magnetic recording apparatuses) of computers, and the like. It is also used as any of cushioning rubbers (crash stoppers) of hard disk drives, binders for electrode active materials of nickel hydrogen secondary batteries, binders for active materials of lithium ion batteries, polymer electrolytes of lithium secondary batteries, binders for positive electrodes of alkaline storage batteries, binders for EL elements (electroluminescent elements), binders, encapsulants, and sealing agents for electrode active materials of capacitors, covering materials for quartz of optical fibers, films and sheets such as covering materials for optical fibers, pottings, coatings, and bonding seals for electronic components and circuit boards, fixing agents for electronic components, modifiers for encapsulants such as epoxies, coating agents for printed boards, modifiers for printed wiring board prepreg resins such as epoxies, scattering inhibitors for electric light bulbs and the like, gaskets for computers, large computer cooling hoses, packings such as gaskets and O-rings for secondary batteries, especially for lithium secondary batteries, sealing layers, connectors, and dampers covering one or both of the outside surfaces of organic EL structures, and the like.

In the above chemical agent transportation equipment field, the crosslinked product of the present disclosure can be used for safety valves and loading valves of trucks, trailers, tanker trucks, shipping, and the like.

In the above field of equipment components for exploring and mining energy resources such as petroleum and gas, the crosslinked product of the present disclosure is used as any of various seal materials used in mining petroleum, natural gas, and the like, and boots of electrical connectors used in oil wells.

Examples of the specific forms of use in the above field of equipment components for exploring and mining energy resources include drill bit seals, pressure regulating diaphragms, seals of horizontal drilling motors (stators), stator bearing (shaft) seals, seal materials used in blowout preventers (BOPs), seal materials used in rotary blowout preventers (pipe wipers), seal materials and gas-liquid connectors used in measurement while drilling (MWD) systems, logging tool seals (for example, O-rings, seals, packings, gas-liquid connectors, boots, and the like) used in logging apparatuses (logging equipment), expandable packers and completion packers, and packer seals used therefor, seals and packings used in cementing apparatuses, seals used in perforators (perforating apparatuses), seals, packings, and motor linings used in mud pumps, covers of geophones, U-cups, composition seating cups, rotary seals, laminate elastomeric bearings, seals for flow rate control, seals for sand volume control, seals of safety valves, seals of hydraulic fracturing apparatuses (fracturing equipment), seals and packings of linear packers and linear hangers, seals and packings of well heads, seals and packings of chokes and valves, seal materials for logging while drilling (LWD) systems, diaphragms (for example, diaphragms for feeding lubricating oil in petroleum mining pits and the like) used in applications of exploring and mining petroleum, gate valves, electronic boots, and seal elements of perforating guns.

Besides, the crosslinked product of the present disclosure can also be used for joint seals in kitchens, bathrooms, lavatories, and the like; coated cloth of outdoor tents; seals for materials of stamps; rubber hoses for gas heat pumps and Freon resistant rubber hoses; films, linings, and weather resistant covers for agriculture; tanks of laminated steel plate and the like used in the field such as construction and home appliances; and the like.

Furthermore, the crosslinked product of the present disclosure can also be used as an article bonded to a metal such as aluminum. Examples of such forms of use include door seals, gate valves, pendulum valves, and solenoid tips, as well as piston seals and diaphragms bonded to metals and metal rubber components bonded to metals, such as metal gaskets.

In addition, it can also be used for rubber components in bicycles, brake shoes, brake pads, and the like.

Also, one exemplary form of the crosslinked product of the present disclosure is a belt.

Examples of the above belt include the following: power transmission belts (including flat belts, V-belts, V-ribbed belts, toothed belts, and the like), and transportation belts (conveyor belts) such as flat belts used for various locations exposed to a high temperature, such as locations around engines of agricultural machines, machine tools, and industrial machines; conveyor belts for transporting scattered matters or particles of coal, smashed rock, earth and sand, ores, wood chips, and the like under a high temperature environment; conveyor belts used in iron mills such as blast furnaces; conveyor belts in applications exposed to a high temperature environment in precision equipment assembling factories, food factories, and the like; V-belts and V-ribbed belts for agricultural machines, general equipment (for example, OA equipment, printing machines, dryers for business purposes, and the like), automobiles, and the like; power transmission belts of transporting robots; toothed belts such as power transmission belts of food machines and machine tools; and toothed belts for automobiles, OA equipment, medical uses, and printing machines.

In particular, representative examples of the toothed belts for automobiles include timing belts.

The above belts may have a single layer structure or a multilayer structure.

In the case of a multilayer structure, the above belts may be composed of a layer obtained by crosslinking the crosslinkable composition of the present disclosure and a layer composed of a further material.

Examples of the layer composed of a further material in the belts with a multilayer structure include layers composed of a further rubber, layers composed of a thermoplastic resin, various fiber reinforced layers, canvases, and metal foil layers.

The crosslinked product of the present disclosure can also be used for vibration proofing pads for industrial use, vibration proofing mats, slab mats for railways, pads, vibration proofing rubbers for automobiles, and the like.

Examples of the vibration proofing rubbers for automobiles include vibration proofing rubbers for engine mounts, for motor mounts, for member mounts, for strut mounts, for bushes, for dampers, for muffler hangers, for center bearings, and the like.

Further examples of the form of use include joint members such as flexible joints and expansion joints, boots, and grommets. In the shipping field, the crosslinked product of the present disclosure can be used for marine pumps and the like, for example.

The joint members refer to joints used in piping and piping facilities, and are used in applications such as preventing vibration and noise generated from piping systems, absorbing expansion and contraction or displacement caused by temperature change or pressure change, absorbing dimensional variation, and mitigating or preventing the effects caused by earthquakes or ground subsidence.

The flexible joints and expansion joints can be preferably used as molded bodies with complicated shapes for shipbuilding piping, for machinery piping such as pumps and compressors, for chemical plant piping, for electrical piping, for piping of civil engineering works and waterworks, for automobiles, and the like, for example.

The boots can be preferably used as molded bodies with complicated shapes, such as boots for various industries, including boots for automobiles such as constant velocity joint boots, dust covers, rack and pinion steering boots, pin boots, and piston boots, boots for agricultural machines, boots for industrial vehicles, boots for construction machines, boots for hydraulic machines, boots for pneumatic machines, boots for centralized lubrication machines, boots for liquid transfer, boots for firefighting, and boots for transferring various liquefied gases.

The crosslinked product of the present disclosure can also be used for diaphragms for filter presses, diaphragms for blowers, diaphragms for water supply, diaphragms for liquid storage tanks, diaphragms for pressure switches, diaphragms for accumulators, diaphragms for air springs such as suspensions, and the like.

By adding the crosslinked product of the present disclosure to a rubber or a resin, an antislipping agent can be obtained that produces a molded article or a coating film that is not slippery in an environment that gets wet with water such as rain, snow, ice, or sweat.

In addition, the crosslinked product of the present disclosure can also be used as a cushioning material for heat press molding in production of decorative plywood, printed circuit boards, electrically insulated plates, hard polyvinyl chloride laminates, and the like from melamine resins, phenolic resins, epoxy resins, and the like.

Besides, the crosslinked product of the present disclosure can also contribute to give impermeability to various supports such as sealing gaskets related to weapons and protective clothing against contact with invasive chemical agents.

In addition, the crosslinked product of the present disclosure can be used for O-rings (square rings), V-rings, X-rings, packings, gaskets, diaphragms, oil seals, bearing seals, lip seals, plunger seals, door seals, lip and face seals, gas delivery plate seals, wafer support seals, barrel seals, and other various seal materials used for sealing or encapsulating lubricating oils (engine oils, mission oils, gear oils, and the like), fuel oils, and grease (in particular, urea grease) containing amine-type additives (in particular, amine-type additives used as antioxidants, detergents, or dispersants) used in, for example, means of transportation such as automobiles and shipping. It can also be used as any of tubes, hoses, various rubber rolls, coatings, belts, and valve elements of valves. Moreover, it can also be used as any of lamination materials and lining materials.

It can also be used as a covering material for heat resistant and oil resistant electric wires used as, for example, lead electric wires for sensors that come into contact with transmission oil and/or engine oil and detect their oil temperature and/or oil pressure in internal combustion engines of automobiles and the like, and can also be used in a high temperature oil atmosphere such as in the oil pan of automatic transmissions and engines.

Besides, the crosslinked product of the present disclosure may be used to form a vulcanized film. Specific examples of such an application include non-sticky oil resistant rolls for copiers, weather resistant weather strips for preventing ice formation, rubber stoppers for infusion solutions, vial rubber stoppers, mold release agents, non-sticky light duty transportation belts, stickiness preventive films of pulley gaskets of automobile engine mounts, covering processing of synthetic fibers, and bolt members or joints having a packing covering thin layer.

Note that the applications of the crosslinked product of the present disclosure with respect to the automobile-related components encompasses applications for motorcycle components with similar structures.

Also, examples of the fuel in the above automobile-related field include light oil, gasoline, and fuels for diesel engines (including biodiesel fuel).

In addition to being crosslinked and used as a crosslinked product, the crosslinkable composition of the present disclosure can also be used as various components in a variety of industrial fields. Therefore, applications of the crosslinkable composition of the present disclosure will be described next.

The crosslinkable composition of the present disclosure can be used for surface modifiers for metals, rubbers, plastics, glass, and the like; seal materials and covering materials that require heat resistance, chemical resistance, oil resistance, and non-stickiness, such as metal gaskets and oil seals; non-sticky covering materials or bleed barriers, such as rolls for OA equipment and belts for OA equipment; impregnation of woven fabric sheets and belts, and application by baking; and the like.

The crosslinkable composition of the present disclosure can be used as seal materials, linings, and sealants with complicated shapes by usual methods by making it have a high viscosity and a high concentration; can be used to form thin films of several microns by making it have a low viscosity; and can be used for application of precoated metals, O-rings, diaphragms, and reed valves by making it have a medium viscosity.

Furthermore, it can also be used for application of transportation rolls or belts for woven fabrics and paper leaves, belts for printing, chemical resistant tubes, medicine stoppers, and fuel hoses.

As articles and substrates to be covered with the crosslinkable composition of the present disclosure, the following can be used: metals such as iron, stainless steel, copper, aluminum, and brass; glass products such as glass plates; woven and non-woven fabrics of glass fibers; molded articles and covered products of general purpose and heat resistant resins such as polypropylene, polyoxymethylene, polyimide, polyamide-imide, polysulfone, polyethersulfone, and polyether ether ketone; molded articles and covered products of general purpose rubbers such as SBR, butyl rubber, NBR, and EPDM, and of heat resistant rubbers such as silicone rubber and fluororubber; woven and non-woven fabrics of natural fibers and synthetic fibers; and the like.

The covered products foiled from the crosslinkable composition of the present disclosure can be used in fields where heat resistance, solvent resistance, lubricity, and non-stickiness are required, and examples of the specific applications include rolls (for example, fixing rolls and adhesion rolls) and transportation belts for OA equipment such as copiers, printers, and facsimiles; sheets and belts; O-rings, diaphragms, chemical resistant tubes, fuel hoses, valve seals, gaskets for chemical plants, engine gaskets, and the like.

The crosslinkable composition of the present disclosure can also be dissolved in a solvent and used as a coating material or adhesive. It can also be used as an emulsion dispersion (latex) and as a coating material.

The above composition is used as any of seal materials and linings for various apparatuses, piping, and the like; surface-treating agents for structures composed of inorganic and organic substrates such as metals, ceramics, glass, stone, concrete, plastics, rubbers, wood, paper, and fibers; and the like.

The above composition can be applied to substrates and the like by dispenser method painting or screen printing painting.

The crosslinkable composition of the present disclosure may be used as a coating material composition for casting a film or for immersing a substrate such as fabric, plastic, metal, or elastomer.

In particular, the crosslinkable composition of the present disclosure may be used, in the form of latex, to produce covered fabrics, protective gloves, impregnated fibers, O-ring coverings, coverings for fuel system quick coupling O-rings, coverings for fuel system seals, coverings for fuel tank rollover valve diaphragms, coverings for fuel tank pressure sensor diaphragms, coverings for oil filter and fuel filter seals, coverings for fuel tank sender seals and sender head fitting seals, coverings for copier fusing mechanism rolls, and polymer coating material compositions.

It is useful for covering silicone rubbers, nitrile rubbers, and other elastomers. For the purpose of increasing both the permeability resistance and chemical resistance of the substrate elastomers as well as their thermal stability, it is also useful for covering components produced from such elastomers. Other applications include coverings for heat exchangers, expansion joints, butts, tanks, fans, flue ducts and other pipe conduits, and storage structures such as concrete storage structures. The above composition may be applied to exposed cross-sections of multilayer component structures, for example, in methods for producing hose structures and diaphragms. Sealing members in connections and joints are often composed of hard materials, and the crosslinkable composition of the present disclosure provides a tight fit with improved frictional interface, leakage along the sealing surface reduced to a trace amount, and enhanced dimensions. That latex increases seal durability in a variety of automobile system applications.

The crosslinkable composition of the present disclosure can also be used in production of power steering systems, fuel systems, air conditioning systems, and any joints where hoses and tubes are connected to other components. Further usefulness of the above composition is in repairing manufacturing defects (and damages caused by use) in multilayer rubber structures such as three-layer fuel hoses. The above composition is also useful for application to thin steel plates that can be famed or embossed before or after the coating material is applied. For example, multiple layers of covered steel can be assembled to create a gasket between two rigid metal members. The sealing effect is obtained by applying the crosslinkable composition of the present disclosure between those layers. This process can be used to produce engine head gaskets and exhaust manifold gaskets for the purpose of lowering the bolt forces and strains of the assembled components, while providing good fuel savings and low emissions due to low cracks, deflections, and hole strains.

Besides, the crosslinkable composition of the present disclosure can also be used as any of the following: coating agents; substrate integrated gaskets and packings that are foamed by dispensing and molding onto substrates containing inorganic materials such as metals and ceramics; multilayer articles famed by coating onto substrates containing inorganic materials such as metals and ceramics; and the like.

Although the embodiments have been described above, it will be understood that a wide variety of modifications can be made in the faun and details without departing from the spirit and scope of the claims.

According to the present disclosure, provided is a method for producing a perfluoroelastomer, comprising carrying out polymerization of a perfluoromonomer in an aqueous medium in the presence of a polymer (1) to provide a perfluoroelastomer, the polymer (1) containing a polymerized unit (1) derived from a monomer represented by the following general formula (1):

  (1)

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —SO$_3$M, —OSO$_3$M, or —C(CF$_3$)$_2$OM, where M is H, a metal atom, NR$^7_4$, imidazolium optionally having a substituent, pyridinium optionally having a substituent, or phosphonium optionally having a substituent and R$^7$ is —H or an organic group, with the proviso that at least one of X, Y, and Z contains a fluorine atom.

In the general formula (1), it is preferable that at least one of X is —H.

In the production method of the present disclosure, it is preferable that the polymerized unit (1) of the polymer (1) is a polymerized unit (1A) derived from a monomer represented by the following general formula (1A):

  (1A)

wherein Rf and A are as described above.

In the general formula (1) and the general formula (1A), it is preferable that A is —COOM.

It is preferable that the content of the polymerized unit (1) in the polymer (1) is 90 mol % or more based on all polymerized units.

It is preferable that the polymer (1) has a number average molecular weight of $3.0 \times 10^4$ or more.

In the production method of the present disclosure, it is preferable that the polymer (1) is added in an amount of 0.01 to 20% by mass based on 100% by mass of the aqueous medium.

In the production method of the present disclosure, it is preferable that the polymerization of the perfluoromonomer is carried out in the presence of a polymerization initiator and that the polymerization initiator is added in an amount of 0.0001 to 10% by mass based on 100% by mass of the perfluoromonomer.

In the production method of the present disclosure, it is preferable that the polymerization of the perfluoromonomer is carried out substantially in the absence of a fluorine-containing surfactant except for a compound having a functional group capable of reacting by radical polymerization and a hydrophilic group.

Also, according to the present disclosure, provided is a method for producing a crosslinkable composition, comprising obtaining a perfluoroelastomer by the above production method, and thereafter mixing the perfluoroelastomer and at least one selected from the group consisting of an inorganic nitride, an organotin compound, an ammonia-generating compound, and a cross-linking agent, to provide a crosslinkable composition.

Also, according to the present disclosure, provided is a method for producing a crosslinked product, comprising obtaining a crosslinkable composition by the above production method, and thereafter crosslinking the crosslinkable composition to provide a crosslinked product.

Also, according to the present disclosure, provided is a composition comprising a perfluoroelastomer and a polymer (1) containing a polymerized unit (1) derived from a monomer represented by the following general formula (1):

  (1)

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —SO$_3$M, —OSO$_3$M, or —C(CF$_3$)$_2$OM, where M is H, a metal atom, NR$^7_4$, imidazolium optionally having a substituent, pyridinium optionally having a substituent, or phosphonium optionally having a substituent and R$^7$ is —H or an organic group, with the proviso that at least one of X, Y, and Z contains a fluorine atom.

In the composition of the present disclosure, it is preferable that the polymerized unit (1) of the polymer (1) is a polymerized unit (1A) derived from a monomer represented by the following general formula (1A):

  (1A)

wherein Rf and A are as described above.

In the composition of the present disclosure, it is preferable that the content of the polymer (1) is 0.0001 to 20% by mass based on the perfluoroelastomer.

It is preferable that the composition of the present disclosure is an aqueous dispersion.

In the composition of the present disclosure, it is preferable that the solid concentration of the aqueous dispersion is 5 to 50% by mass based on the aqueous dispersion.

It is preferable that the composition of the present disclosure is substantially free from a fluorine-containing surfactant.

Also, according to the present disclosure, provided is a crosslinkable composition comprising the above composition and at least one selected from the group consisting of an inorganic nitride, an organotin compound, an ammonia-generating compound, and a cross-linking agent.

Also, according to the present disclosure, provided is a crosslinked product obtained by crosslinking the above crosslinkable composition.

EXAMPLES

Hereinafter, the embodiments of the present disclosure will be described with reference to Examples, but the present disclosure is not limited solely to such Examples.

Each numerical value in Examples was measured by the following methods.

<Solid Concentration>

In an air dryer, 1 g of the aqueous dispersion containing the perfluoroelastomer was dried at a condition of 150° C. for 60 minutes, and the proportion of the mass of the non-volatile matter to the mass of the aqueous dispersion (1 g) was expressed by percentage and taken as the solid concentration thereof.

<Compositional Features of Perfluoroelastomer>

Measurement was performed by $^{19}$F-NMR (solid-state NMR) and a Fourier transform infrared spectrophotometer (FT-IR).

<Glass Transition Temperature of Perfluoroelastomer>

As for the glass transition temperature, by using a differential scanning calorimeter (manufactured by Mettler-Toledo, DSC822e) and increasing the temperature of 10 mg of the sample at 10° C./min, a DSC curve was obtained, and then the peak top temperature of the differential curve specified in JIS K6240 was taken as the glass transition temperature.

<Polymerization Rate>

The polymerization rate was calculated by the following expression.

polymerization rate={weight of aqueous dispersion× solid concentration/100}/{(amount of pure water used in polymerization+amount of water contained in aqueous solution of polymer (1) used in polymerization)×polymerization time}

The units for each amount in the expression are as follows.

weight of aqueous dispersion: g
solid concentration: % by mass
amount of pure water used in polymerization: kg
amount of water contained in aqueous solution of polymer (1) used in polymerization: kg
polymerization time: hour
polymerization rate: g/(hour×kg)

<Volume Average Particle Size of Perfluoroelastomer Particles>

Measurement was performed by the dynamic light scattering method. The aqueous dispersion obtained by the polymerization was diluted 10 times with pure water to prepare an aqueous dispersion for particle size measurement, which was then measured using ELSZ-1000S (manufactured by Otsuka Electronics Co., Ltd.) at 25° C. with 70 measurement processes. The refractive index of the solvent (water) was 1.3328 and the viscosity of the solvent was 0.8878. The average value of the volume distribution was taken as the particle size.

<Number of Perfluoroelastomer Particles in Aqueous Dispersion>

The number of perfluoroelastomer particles was calculated by the following expression.

Number of polymer particles =

$$\left\{\frac{\text{Solid concentration of aqueous dispersion (mass \%)}}{100 - \text{Solid concentration of aqueous dispersion (mass \%)}}\right\} /$$

$$\left\{\frac{4}{3} \times 3.14 \times \left(\frac{\text{Average particle size (nm)}}{2} \times 10^{-9}\right)^3 \times \text{Specific gravity} \times 10^6\right\}$$

In the expression, the number of polymer particles (the number of perfluoroelastomer particles) is per 1 cc of water, and, as the specific gravity, the measured value of the specific gravity of the synthesized perfluoroelastomer was used.

<Specific Gravity of Perfluoroelastomer>

Measurement was performed using an automatic specific gravity meter DMA-220H (manufactured by Shinko Denshi Co., Ltd.).

<Method for Measuring Content of Dimer and Trimer of Monomer (Such as Monomer D) in Polymer (Such as Polymer D)>

(1) Extraction from Aqueous Solution

The solids in the aqueous solution of the polymer were measured, and the aqueous solution in an amount corresponding to 0.2 g of the solids of the polymer was weighed. Then, water and methanol were added such that the volume ratio of water to methanol was 50/50 (% by volume) in combination with the water contained in the aqueous solution, and a mixed solution containing the polymer and water and methanol was obtained. Thereafter, centrifugation was carried out using the obtained mixed solution at 4,000 rpm for 1 hour, and the supernatant containing the polymer was collected as the extracted liquid.

Analysis of the extracted liquid was carried out using a liquid chromatograph mass spectrometer (Waters, LC-MS ACQUITY UPLC/TQD), and the chromatogram of the extracted liquid was obtained.

The content of the dimer and trimer of the monomer contained in the extracted liquid was determined by converting the peak integrated value derived from the dimer and trimer of the monomer appearing in the chromatogram of the extracted liquid into the content of the dimer and trimer of the monomer using a calibration curve.

(2) Calibration Curve of Monomer

Methanol standard solutions of the monomer with five known content levels of 1 ng/mL to 100 ng/mL were prepared, and measurement was carried out using a liquid chromatograph mass spectrometer (Waters, LC-MS ACQUITY UPLC/TQD). The relationship between the respective monomer contents and the peak integrated values corresponding to those contents were plotted to create a calibration curve (first approximation) for each monomer. Next, the calibration curve (first approximation) for each monomer was used to create a calibration curve for the dimer and trimer of each monomer.

Measurement Equipment Configuration and LC-MS Measurement Conditions

TABLE 1

| | LC unit |
|---|---|
| Apparatus | Acquity UPLC manufactured by Waters |
| Column | Acquity UPLC manufactured by Waters BEH C18 1.7 mm (2.1\50 mm) |
| Mobile phase | A CH$_3$CN |
| | B 20 mM CH$_3$COONH$_4$/H$_2$O |
| | 0 → 1.5 min   A:B = 10:90 |
| | 1.5 → 8.5 min   A:B = 10:90 → |
| | A:B = 90:10 Linear gradient |
| | 8.5 → 10 min   A:B = 90:10 |

TABLE 1-continued

| | |
|---|---|
| Flow rate | 0.4 mL/min |
| Column temperature | 40° C. |
| Sample injection volume | 5 μL |

MS unit

| | |
|---|---|
| Apparatus | TQ Detecter |
| Measurement mode | MRM (Multiple Reaction Monitoring) |
| Ionization method | Electrospray ionization SCAN |

The quantification limit in this measurement equipment configuration is 1 ng/mL.

In Examples, a homopolymer of the monomer represented by the formula: $CH_2=CF(CF_2OCFCF_3COONH_4)$ (number average molecular weight of $9.0\times10^4$, weight average molecular weight of $19.0\times10^4$) (hereinafter, referred to as polymer A) was used.

<Method for Measuring Weight Average Molecular Weight (Mw) and Number Average Molecular Weight (Mn) of Polymer (Such as Polymers A and D)>

The number average molecular weight and weight average molecular weight of the polymer were determined by performing measurement by gel permeation chromatography (GPC) using GPC HLC-8020 manufactured by Tosoh Corporation, using Shodex columns manufactured by SHOW DENKO K.K. (one GPC KF-801, one GPC KF-802, and two GPC KF-806M connected in series), and allowing tetrahydrofuran (THF) to flow at a flow rate of 1 ml/min as the solvent, and by calculating the molecular weights using monodisperse polystyrene as the standard.

Example 1

In a stainless steel autoclave with an internal volume of 0.5 liters (equipped with a FULLZONE type stirring blade and one baffle plate) without an ignition source, 194.9 g of deionized water and 1.95 g of polymer A were placed, and the system was thoroughly purged with nitrogen gas, degassed, and heated to 54° C. while stirring at 1,000 rpm. Then, a mixed gas of tetrafluoroethylene (TFE) and perfluoromethyl vinyl ether (PMVE) (TFE/PMVE=24/76 mol % ratio) was charged therein such that the internal pressure reached 0.83 MPa·G. Next, 0.259 g of $CF_2=CFOCF_2CF(CF_3)OCF_2CF_2CN$ (CNVE) was pressed in with nitrogen, and then 1.03 g of ammonium persulfate (APS) was dissolved in 2.5 g of water and pressed in with nitrogen to start the reaction.

As the polymerization progressed, the pressure in the chamber was decreased, and therefore, when the pressure reached 0.735 MPa·G, 2 g of TFE and 2.2 g of PMVE were introduced into the autoclave to raise the pressure. Similarly, as the reaction progressed, TFE and PMVE were pressed in at a ratio of 60/40 mol %, and the pressure was repeatedly increased and decreased between 0.735 MPa·G and about 0.89 MPa·G, so that 10 g of TFE and 11 g of PMVE were pressed in by the end of polymerization. During the polymerization, when the total amount of TFE charged reached 6 g and 10 g respectively, each of 0.259 g of $CF_2=CFOCF_2CF(CF_3)OCF_2CF_2CN$ was pressed in twice with nitrogen.

Thereafter, the autoclave was cooled and the unreacted monomer was released to obtain 217 g of an aqueous dispersion with a solid concentration of 7.8% by mass. The polymerization time was 9.9 hours. The aqueous dispersion was completely free from agglomerated polymer, and after the aqueous dispersion was taken out, there was no adhered polymer inside the chamber of the autoclave, such as the stirring blade, chamber wall, and baffle plate.

100 g of the obtained aqueous dispersion was mixed with and diluted with 100 g of pure water. This mixed and diluted solution was added dropwise to 750 g of 3.5% aqueous hydrochloric acid solution. The dropping was carried out while stirring the aqueous hydrochloric acid solution.

The perfluoroelastomer was coagulated in the aqueous hydrochloric acid solution, and thus the coagulated perfluoroelastomer was filtered out, transferred to 100 g of pure water, and washed with stirring for 5 minutes. After the 5 minutes, the perfluoroelastomer was again filtered out, transferred to 100 g of pure water, and washed with stirring for 5 minutes. This washing operation with 100 g of pure water was repeated three times, and then the perfluoroelastomer was filtered out. The filtered-out perfluoroelastomer was vacuum dried at 70° C. for 48 hours. After the drying, a composition (crumb) containing the perfluoroelastomer and polymer A was obtained. The obtained composition had a mass of 7.0 g.

Analysis of the obtained perfluoroelastomer showed the following results.

Compositional features of perfluoroelastomer: TFE/PMVE/CNVE=51.7/47.9/0.42 (mol %)

Glass transition temperature of perfluoroelastomer: −3.4° C.

The polymerization rate was calculated by the above expression and it was 8.8 g/(hour×kg).

The volume average particle size of perfluoroelastomer particles in the aqueous dispersion was 166.5 nm. The number of perfluoroelastomer particles in the aqueous dispersion was calculated by the above expression and it was $1.7\times10^{13}$/cc. The perfluoroelastomer had a specific gravity of 2.023. In addition, the content of polymer A was calculated by dissolving the obtained composition in a fluorine-containing solvent R-318 (manufactured by Daikin Industries, Ltd., main component: $C_4F_8Cl_2$), adding deionized water to the resulting solution, collecting the upper layer (aqueous layer) containing polymer A, heating and drying it, and measuring the mass of the resulting residue (polymer A). The content of polymer A in the composition was 1.70% by mass.

Example 2

The polymerization was carried out in the same manner as in Example 1, except that the amount of deionized water initially charged was changed to 191.0 g and the amount of polymer A was changed to 3.90 g, respectively, thereby obtaining 203 g of an aqueous dispersion with a solid concentration of 8.4% by mass.

The polymerization time was 6.6 hours. The aqueous dispersion was completely free from agglomerated polymer, and after the aqueous dispersion was taken out, there was no adhered polymer inside the chamber of the autoclave, such as the stirring blade, chamber wall, and baffle plate.

For the obtained aqueous dispersion, the post treatment was carried out in the same manner as in Example 1, except that the 3.5% aqueous hydrochloric acid solution to which the diluted solution was added dropwise was changed to 1,500 g, thereby obtaining a composition (crumb) containing 7.8 g of the perfluoroelastomer and polymer A.

Analysis of the obtained perfluoroelastomer was performed in the same manner as in Example 1, and showed the following results.

Compositional features of perfluoroelastomer: TFE/PMVE/CNVE=51.2/48.4/0.41 mol %

Glass transition temperature of perfluoroelastomer: −3.5° C.

The polymerization rate was 13.6 g/(hour×kg), the volume average particle size of perfluoroelastomer particles in the aqueous dispersion was 214.1 nm, and the number of perfluoroelastomer particles in the aqueous dispersion was $8.8 \times 10^{12}$/cc. The perfluoroelastomer had a specific gravity of 2.023. In addition, the content of polymer A was calculated by dissolving the obtained composition in a fluorine-containing solvent R-318 (manufactured by Daikin Industries, Ltd., main component: $C_4F_8Cl_2$), adding deionized water to the resulting solution, collecting the upper layer (aqueous layer) containing polymer A, heating and drying it, and measuring the mass of the resulting residue (polymer A). The content of polymer A in the composition was 2.5% by mass.

Preparation Example 1

220 g of monomer D represented by $CH_2$=$CFCF_2OCF(CF_3)COOH$, 513 g of water, and APS (0.5 mol % based on monomer D) were added to a reactor, and heated and stirred at 60° C. for 24 hours under a nitrogen atmosphere, thereby obtaining aqueous solution D-1 of polymer D containing polymer D, which is a homopolymer of $CH_2$=$CFCF_2OCF(CF_3)COOH$. As a result of GPC analysis of the obtained aqueous solution D-1 of polymer D, polymer D had Mw of 180,000 and Mn of 86,000, and the content of the dimer and trimer was 2.0% by mass based on polymer D.

After adjusting the concentration of polymer D to 5.0% by mass by adding water to the obtained aqueous solution D-1 of polymer D, the solution was brought into contact with an ultrafiltration membrane (molecular weight cut-off: 50,000 Da, made of polyethylene) at 30° C. under a water pressure of 0.1 MPa to perform ultrafiltration. While pouring water as appropriate, the ultrafiltration was continued until a water filtrate of 7 times the volume of the aqueous solution was finally eluted, thereby obtaining aqueous solution D-2 of polymer D. As a result of GPC analysis of the obtained aqueous solution D-2 of polymer D, polymer D had Mw of 180,000 and Mn of 140,000, and the content of the dimer and trimer was less than 1 ppm by mass based on polymer D. The obtained aqueous solution D-2 of polymer D had a concentration of 5.0% by mass.

Example 3

The polymerization was carried out in the same manner as in Example 1, except that 5 g of deionized water and 195 g of aqueous solution D-2 of polymer D were initially placed in the autoclave instead of 194.9 g of deionized water and 1.95 g of polymer A, thereby obtaining 214 g of an aqueous dispersion with a solid concentration of 8.1% by mass.

The polymerization time was 5.4 hours. The aqueous dispersion was completely free from agglomerated polymer, and after the aqueous dispersion was taken out, there was no adhered polymer inside the chamber of the autoclave, such as the stirring blade, chamber wall, and baffle plate.

100 g of the obtained aqueous dispersion was mixed with and diluted with 100 g of pure water. This mixed and diluted solution was added dropwise to 750 g of 3.5% aqueous hydrochloric acid solution. The dropping was carried out while stirring the aqueous hydrochloric acid solution.

The perfluoroelastomer was coagulated in the aqueous hydrochloric acid solution, and thus the coagulated perfluoroelastomer was filtered out, transferred to 100 g of pure water, and washed with stirring for 5 minutes. After the 5 minutes, the perfluoroelastomer was again filtered out, transferred to 100 g of pure water, and washed with stirring for 5 minutes. This washing operation with 100 g of pure water was repeated three times, and then the perfluoroelastomer was filtered out. The filtered-out perfluoroelastomer was vacuum dried at 70° C. for 48 hours. After the drying, a composition (crumb) containing the perfluoroelastomer and polymer D was obtained. The obtained composition had a mass of 6.2 g.

Analysis of the obtained perfluoroelastomer showed the following results.

Compositional features of perfluoroelastomer: TFE/PMVE/CNVE=50.0/49.75/0.25 (mol %)

Glass transition temperature of perfluoroelastomer: −3.7° C.

The polymerization rate was calculated by the above expression and it was 17.1 g/(hour×kg).

The volume average particle size of perfluoroelastomer particles in the aqueous dispersion was 631 nm. The number of perfluoroelastomer particles in the aqueous dispersion was calculated by the above expression and it was $3.3 \times 10^{11}$/cc. The perfluoroelastomer had a specific gravity of 2.030. In addition, the content of polymer D was calculated by dissolving the obtained composition in a fluorine-containing solvent R-318 (manufactured by Daikin Industries, Ltd., main component: $C_4F_8Cl_2$), adding deionized water to the resulting solution, collecting the upper layer (aqueous layer) containing polymer D, heating and drying it, and measuring the mass of the resulting residue (polymer D). The content of polymer D in the composition was 3.74% by mass.

What is claimed is:

1. A method for producing a perfluoroelastomer, comprising carrying out polymerization of a perfluoromonomer in an aqueous medium in the presence of a polymer (1) to provide a perfluoroelastomer, the polymer (1) having a number average molecular weight of $0.3 \times 10^4$ or more and containing a polymerized unit (1) derived from a monomer represented by the following general formula (1):

$$CX_2=CY(-CZ_2-O-Rf-A) \qquad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3M$, —$OSO_3M$, or —$C(CF_3)_2OM$, where M is —H, a metal atom, —$NR^7_4$, imidazolium optionally having a substituent, pyridinium optionally having a substituent, or phosphonium optionally having a substituent and $R^7$ is —H or an organic group, with the proviso that at least one of X, Y, and Z contains a fluorine atom, wherein a content of the polymerized unit (1) in the polymer (1) is 90 mol % or more based on all polymerized units.

2. The production method according to claim 1, wherein at least one of X is —H.

3. The production method according to claim 1, wherein the polymerized unit (1) is a polymerized unit (1A) derived from a monomer represented by the following general formula (1A):

$$CH_2=CF(-CF_2-O-Rf-A) \qquad (1A)$$

wherein Rf and A are as described above.

4. The production method according to claim 1, wherein A is —COOM.

5. The production method according to claim 1, wherein the polymer (1) is added in an amount of 0.01 to 20% by mass based on 100% by mass of the aqueous medium.

6. The production method according to claim 1, wherein the polymerization of the perfluoromonomer is carried out in the presence of a polymerization initiator and the polymerization initiator is added in an amount of 0.0001 to 10% by mass based on 100% by mass of the perfluoromonomer.

7. A method for producing a crosslinkable composition, comprising obtaining a perfluoroelastomer by the production method according to claim 1, and thereafter mixing the perfluoroelastomer and at least one selected from the group consisting of an inorganic nitride, an organotin compound, an ammonia-generating compound, and a cross-linking agent, to provide a crosslinkable composition.

8. A method for producing a crosslinked product, comprising obtaining a crosslinkable composition by the production method according to claim 7, and thereafter crosslinking the crosslinkable composition to provide a crosslinked product.

9. The production method according to claim 1, wherein the polymerization of the perfluoromonomer is carried out substantially in the absence of a fluorine-containing surfactant except for a compound having a functional group capable of reacting by radical polymerization and a hydrophilic group.

* * * * *